US009046194B2

(12) United States Patent
Gandolfo et al.

(10) Patent No.: US 9,046,194 B2
(45) Date of Patent: Jun. 2, 2015

(54) PROTECTIVE CONDUIT FOR A STRUCTURAL PANEL OPENING

(71) Applicant: Specified Technologies Inc., Somerville, NJ (US)

(72) Inventors: Paul Gandolfo, Doylestown, PA (US); Dhanendhran Govender, East Windsor, NJ (US)

(73) Assignee: SPECIFIEDTECHNOLOGIES INC., Somerville, NJ (US)

( * ) Notice: Subject to any disclaimer, the term of this patent is extended or adjusted under 35 U.S.C. 154(b) by 0 days.

(21) Appl. No.: 14/120,571

(22) Filed: Jun. 5, 2014

(65) Prior Publication Data

US 2015/0047276 A1   Feb. 19, 2015

Related U.S. Application Data

(60) Provisional application No. 61/959,042, filed on Aug. 13, 2013.

(51) Int. Cl.
| E04C 2/00 | (2006.01) |
| F16L 5/04 | (2006.01) |
| E04B 5/48 | (2006.01) |
| H02G 3/22 | (2006.01) |

(52) U.S. Cl.
CPC ... F16L 5/04 (2013.01); E04B 5/48 (2013.01); H02G 3/22 (2013.01)

(58) Field of Classification Search
CPC .......... E04B 2002/7488; E04B 2/7411; E04B 2/7457; E04B 1/947; E04B 5/48; A62C 2/065; H02G 3/22; F16L 5/04
USPC .................... 52/232, 220, 221, 220.8; 248/56
See application file for complete search history.

(56) References Cited

U.S. PATENT DOCUMENTS

| 3,678,634 | A | | 7/1972 | Wise et al. |
| 4,093,818 | A | * | 6/1978 | Thwaites et al. ............... 174/505 |
| 4,109,423 | A | | 8/1978 | Perrain |
| 4,136,707 | A | | 1/1979 | Gaillot et al. |
| 4,243,835 | A | | 1/1981 | Ehrenfels |
| 4,245,445 | A | | 1/1981 | Heinen |
| 4,249,353 | A | * | 2/1981 | Berry ............................ 52/232 |
| 4,264,779 | A | | 4/1981 | Rhodes et al. |
| 4,273,821 | A | * | 6/1981 | Pedlow ......................... 428/215 |
| 4,276,332 | A | | 6/1981 | Castle |
| 4,302,917 | A | | 12/1981 | Fermvik et al. |

(Continued)

Primary Examiner — Brian Glessner
Assistant Examiner — Paola Agudelo
(74) Attorney, Agent, or Firm — Fox Rothschild LLP

(57) ABSTRACT

A poke-through pathway device positionable extending through an opening in building panel, such as a wall, ceiling or floor, which defines a duct through which penetrating members, such as cables or wiring may be placed to extend through a building panel wherein the pathway device provides a limited level of protection against fire, heat, smoke or sound being transmitted or traveling therethrough. The present invention provides a limited low level of fire resistance along with some resistance to the transmission of smoke, heat or sound through the duct in those applications where a fully fire-rated device is not required. The present invention includes a two-piece outer housing assembly and with a two-piece inner housing assembly that are telescopically movable with respect to one another for adjustable positioning thereof through building panels of various thicknesses. A two-piece elastomeric wedge seal is positionable on each side of the interior of the inner housing to facilitating sealing.

20 Claims, 20 Drawing Sheets

(56) References Cited

U.S. PATENT DOCUMENTS

| | | | |
|---|---|---|---|
| 4,304,079 A | 12/1981 | Thorsten | |
| 4,336,416 A | 6/1982 | Goodsell | |
| 4,363,199 A | 12/1982 | Kucheria et al. | |
| 4,400,920 A | 8/1983 | Logsdon | |
| 4,419,535 A | 12/1983 | O'Hara | |
| 4,467,577 A | 8/1984 | Licht | |
| 4,467,914 A * | 8/1984 | Trammel et al. | 198/860.2 |
| 4,477,694 A | 10/1984 | Kohaut | |
| 4,493,173 A | 1/1985 | Kohaut | |
| 4,548,853 A | 10/1985 | Bryan | |
| 4,566,242 A | 1/1986 | Dunsworth | |
| 4,646,486 A | 3/1987 | Hauff | |
| RE32,678 E | 5/1988 | Benscoter et al. | |
| 4,796,401 A | 1/1989 | Wexler | |
| 4,800,926 A | 1/1989 | Beck | |
| 4,894,966 A | 1/1990 | Bailey et al. | |
| 4,901,488 A | 2/1990 | Murota et al. | |
| 5,032,690 A | 7/1991 | Bloom | |
| 5,067,676 A * | 11/1991 | Beele | 248/56 |
| 5,099,625 A | 3/1992 | Staudt | |
| 5,121,594 A | 6/1992 | Wuertz | |
| 5,132,054 A | 7/1992 | Stahl | |
| 5,137,658 A | 8/1992 | Stahl | |
| 5,174,077 A | 12/1992 | Murota | |
| 5,220,131 A | 6/1993 | Wuertz | |
| 5,237,128 A | 8/1993 | Wuertz | |
| 5,257,641 A | 11/1993 | Elsbury et al. | |
| 5,272,278 A | 12/1993 | Wuertz | |
| 5,331,946 A | 7/1994 | Yamini et al. | |
| 5,391,840 A * | 2/1995 | Hughes et al. | 174/68.3 |
| 5,393,930 A | 2/1995 | Wuertz | |
| 5,410,103 A | 4/1995 | Wuertz | |
| 5,421,127 A | 6/1995 | Stefely | |
| 5,452,551 A | 9/1995 | Charland et al. | |
| 5,456,050 A * | 10/1995 | Ward | 52/220.8 |
| 5,467,565 A | 11/1995 | Bowman et al. | |
| 5,594,202 A | 1/1997 | Tobias | |
| 5,641,940 A | 6/1997 | Whitehead | |
| 5,661,891 A | 9/1997 | Miller et al. | |
| 5,696,349 A | 12/1997 | Bera | |
| 5,729,938 A | 3/1998 | Tobias | |
| 5,740,698 A | 4/1998 | Myronuk et al. | |
| 5,747,732 A | 5/1998 | Bera et al. | |
| 5,814,764 A | 9/1998 | Kohaut | |
| 5,830,319 A | 11/1998 | Landin | |
| 5,953,872 A | 9/1999 | MacMillian et al. | |
| 5,974,750 A | 11/1999 | Landin et al. | |
| 6,018,126 A | 1/2000 | Castellani et al. | |
| 6,112,488 A | 9/2000 | Olson et al. | |
| 6,114,623 A | 9/2000 | Bonilla et al. | |
| 6,141,915 A | 11/2000 | Andersen et al. | |
| 6,153,668 A | 11/2000 | Gestner et al. | |
| 6,158,180 A | 12/2000 | Edwards | |
| 6,175,078 B1 | 1/2001 | Bambardekar et al. | |
| 6,176,052 B1 | 1/2001 | Takahashi | |
| 6,180,882 B1 | 1/2001 | Dinh | |
| 6,307,152 B1 | 10/2001 | Bonilla et al. | |
| 6,353,180 B1 | 3/2002 | DeBartolo, Jr. et al. | |
| 6,360,502 B1 | 3/2002 | Stahl, Jr. | |
| 6,390,135 B1 * | 5/2002 | Shimizu | 138/89 |
| 6,536,169 B2 | 3/2003 | Dykhoff | |
| 6,699,035 B2 * | 3/2004 | Brooker | 431/346 |
| 6,732,481 B2 | 5/2004 | Stahl, Sr. | |
| 6,848,227 B2 | 2/2005 | Whitty | |
| 6,928,777 B2 * | 8/2005 | Cordts | 52/220.8 |
| 6,969,799 B2 * | 11/2005 | Snyder | 174/483 |
| 7,373,761 B2 | 5/2008 | Stahl, Sr. | |
| 7,523,590 B2 | 4/2009 | Stahl, Sr. | |
| 7,581,362 B2 | 9/2009 | Vaughan | |
| 7,681,365 B2 | 3/2010 | Klein | |
| 7,694,474 B1 | 4/2010 | Stahl, Sr. et al. | |
| 7,762,032 B2 | 7/2010 | Frenkel | |
| 7,814,718 B2 | 10/2010 | Klein | |
| 7,866,108 B2 | 1/2011 | Klein | |
| 7,913,468 B2 | 3/2011 | Spais | |
| 7,950,198 B2 | 5/2011 | Pilz et al. | |
| 8,006,447 B2 | 8/2011 | Beele | |
| 8,051,614 B1 * | 11/2011 | Peck et al. | 52/220.8 |
| 8,056,293 B2 | 11/2011 | Klein | |
| 8,087,205 B2 | 1/2012 | Pilz et al. | |
| 8,132,376 B2 | 3/2012 | Pilz et al. | |
| 8,136,314 B2 | 3/2012 | Klein | |
| D657,232 S | 4/2012 | Stahl, Sr. et al. | |
| 8,151,526 B2 | 4/2012 | Klein | |
| 8,281,552 B2 | 10/2012 | Pilz et al. | |
| 8,322,094 B2 | 12/2012 | Pilz et al. | |
| RE43,997 E | 2/2013 | Stahl, Sr. | |
| RE44,033 E | 3/2013 | Stahl, Sr. | |
| 8,397,452 B2 * | 3/2013 | Stahl et al. | 52/232 |
| 8,541,698 B2 * | 9/2013 | Perschon et al. | 174/650 |
| 2002/0032996 A1 | 3/2002 | Cornwall | |
| 2003/0051423 A1 | 3/2003 | Munzenberger | |
| 2004/0016191 A1 | 1/2004 | Whitty | |
| 2006/0138251 A1 | 6/2006 | Stahl, Sr. | |
| 2007/0169963 A1 * | 7/2007 | Beele | 174/650 |
| 2008/0128998 A1 * | 6/2008 | Klein et al. | 277/604 |
| 2010/0059941 A1 * | 3/2010 | Beele | 277/606 |

* cited by examiner

PROTECTIVE CONDUIT FOR A STRUCTURAL PANEL OPENING

The present utility application hereby formally claims priority of U.S. Provisional Patent application No. 61/959,042 filed Aug. 13, 2013 on a "Protective Conduit For A Structural Panel Opening" filed naming the same inventors as listed herein, namely, Paul Gandolfo and Dhanendhran Govender, and assigned to the same assignee as listing herein, namely, Specified Technologies Inc, and said referenced provisional application is hereby formally incorporated by reference as an integral part of the present application.

BACKGROUND OF THE INVENTION

1. Field of the Invention

The present invention deals with the field of poke-through pathway devices positionable in walls, ceiling and floors or commercial and residential buildings for allowing various types of penetrating members such as electronic cables, pipes, or wires that would need to extend from room to room with a building. These pathway devices are required to have various levels or sealing therewithin for limiting transmission of sound therethrough and preventing the spreading of fire, heat and smoke therefore during a fire.

2. Description of the Prior Art

Many prior art devices have been patented for the purposes of providing enhanced poke-through conduits with enhanced fire, smoke, heat and sound insulating characteristics such as shown in U.S. Pat. No. 3,678,623 patented Jul. 25, 1972 to E. H. Wise et al and assigned to R & G Sloane Manufacturing Company, Inc. on a "Fire Isolation And Insulating Apparatus"; and U.S. Pat. No. 4,109,423 patented Aug. 29, 1978 to M. E. Perrain and assigned to Pont-a-Mousson S.A. on a "Fire-Proof Device For A Tube Of Fusible Material Which Extends Through A Wall"; and U.S. Pat. No. 4,136,707 patented Jan. 30, 1979 to J. P. Gaillot et al and assigned to Pont-a-Mousson S.A. on a "Fire-Resisting Device For Piping Extending Through A Wall"; and U.S. Pat. No. 4,243,835 patented Jan. 6, 1981 to A. I. Ehrenfels and assigned to Harvey Hubbell, Incorporated on a "Non-Rigid Mechanical Coupling For A Fire-Rated Feed-Through Fitting And Method Of Making"; and U.S. Pat. No. 4,245,445 patented Jan. 20, 1981 to H. D. J. Heinen and assigned to Intellectual Trade Cy S.A. Great Duchy of Luxembourg on a "Method For Making A Fire-Proof Passage And Passage Obtained Thereby"; and U.S. Pat. No. 4,249,353 patented Feb. 10, 1981 to R. C. Berry and assigned to Crouse-Hinds Company on a "Fire Barrier Assembly For Electrical Cable"; and U.S. Pat. No. 4,264,779 patented Apr. 28, 1981 to T. R. Rhodes et al and assigned to General Signal Corporation on a "Poke-Through Electrical Fitting With Releasable Wedging Point For Retention"; and U.S. Pat. No. 4,276,332 patented Jun. 30, 1981 to G. K. Castle on a "Fire Proof Cable Tray Enclosure"; and U.S. Pat. No. 4,302,917 patented Dec. 1, 1981 to L. A. Fernvik et al and assigned to Telefonaktiebolaget L M. Ericsson on a "Method And Means For Fire-Sealing A Penetration For A Conduit"; and U.S. Pat. No. 4,304,079 patented Dec. 8, 1981 to N. H. Thorsten and assigned to Bell Telephone Laboratories, Incorporated on a "Fire Retardant Modular Floor Penetration Structure"; and U.S. Pat. No. 4,336,416 patented Jun. 22, 1982 to J. P. Goodsell and assigned to Harvey Hubbell Incorporated on a "Fire-Rated Feed-Through Fitting For Transferring Insulated Wires Through A Concrete Floor"; and U.S. Pat. No. 4,363,199 patented Dec. 14, 1982 to C. S. Kucheria et al and assigned to Kennecott Corporation on a "Fire Resistant Sealing System For Holes In Fire Resistant Building Partitions"; and U.S. Pat. No. 4,400,920 patented Aug. 30, 1983 to D. D. Logsdon on a "Apparatus For Securing Pipe"; and U.S. Pat. No. 4,419,535 patented Dec. 6, 1983 to R. J. O'Hara on a "Multi-Cable Conduit For Floors And Walls"; and U.S. Pat. No. 4,467,577 patented Aug. 28, 1984 to R. R. Licht and assigned to Minnesota Mining and Manufacturing Company on an "Intumescent Fire Barrier Material Laminated With Restraining Layer"; and U.S. Pat. No. 4,477,694 patented Oct. 16, 1984 to J. E. Kohaut and assigned to John E. Kohaut and Raceway Components, Inc. on a "Through-Floor Electrical Outlet Fitting"; and U.S. Pat. No. 4,493,173 patented Jan. 15, 1985 to J. E. Kohaut and assigned to Raceway Components, Inc. on an "Automatic Cable Passage Closure And Sealing Device"; and U.S. Pat. No. 4,548,853 patented Oct. 22, 1985 to H. H. Bryan on a "Closure For A Surface Opening Having An Object Passing Therethrough And Method Of Forming The Closure"; and U.S. Pat. No. 4,566,242 patented Jan. 28, 1986 to C. L. Dunsworth and assigned to Metalines, Inc. on a "Smoke And Heat Barrier"; and U.S. Pat. No. 4,646,486 patented Mar. 3, 1987 to W. Hauff on a "Flame-Retarding Wall Feedthrough Fitting"; and U.S. Reissue Pat. No. Re. 32,678 patented May 31, 1988 to R. D. Benscoter et al and assigned to Butler Manufacturing Company on an "Economy Poke-Thru"; and U.S. Pat. No. 4,796,401 patented Jan. 10, 1989 to J. B. Wexler and assigned to Fire Research Pty., Limited on a "Composite Fire Stop Device"; and U.S. Pat. No. 4,800,926 patented Jan. 31, 1989 to P. C. Beck and assigned to Adolph Coors Company on a "Firebreak For Conduits"; and U.S. Pat. No. 4,894,966 patented Jan. 23, 1990 to P. R. Bailey et al on a "Fire Stopping Apparatus"; and U.S. Pat. No. 4,901,488 patented Feb. 20, 1990 to G. Murota et al and assigned to the Furukawa Electric Co., Ltd. on a "Fire/Smoke Protection Structure For A Plastic Pipe Or Cable Channel Portion In A Floor Or Wall"; and U.S. Pat. No. 5,302,690 patented Jul. 16, 1991 to M. G. Bloom and assigned to Masco Building Products Corp. on a "Poke-Through Connector Assembly"; and U.S. Pat. No. 5,067,676 patented Nov. 26, 1991 to J. A. Beele and assigned to CSD International B.V. on a "System For The Prevention Of Fire, Water Or Flue Gas And The Like From Propagating Along Cables"; and U.S. Pat. No. 5,099,625 patented Mar. 31, 1992 to G. Staudt on a "Partition Wall For Openings In Building Shells, Forming Fire Proof Sections"; and U.S. Pat. No. 5,121,594 patented Jun. 16, 1992 to E. S. Wuertz and assigned to Hubbell Incorporated on a "Method For Attaching A Poke-Through Electrical Fitting"; and U.S. Pat. No. 5,132,054 patented Jul. 21, 1992 to J. Stahl and assigned to Specified Technologies Inc. on "Composition Of Matter For A Fire Retardant Intumescent Material Having Two Stages Of Expansion And A Process For Making Thereof"; and U.S. Pat. No. 5,137,658 patented Aug. 11, 1992 to J. Stahl and assigned to Specified Technologies Inc. on a "Process For Forming A Fire Retardant Intumescent Material Having Two Stages Of Expansion"; and U.S. Pat. No. 5,174,077 patented Dec. 29, 1992 to G. Murota and assigned to The Furukawa Electric Co., Ltd on a "Fire Protecting Structure Of Channel Portion Of Plastic Piping In A Fire Partition"; and U.S. Pat. No. 5,220,131 patented Jun. 15, 1993 to E. S. Wuertz and assigned to Hubbell Incorporated on a "Poke-Through Fire Barrier Structure With Knock-Out Openings"; and U.S. Pat. No. 5,237,128 patented Aug. 17, 1993 to E. S. Wuertz and assigned to Hubbell Incorporated on an "Above-Floor Service Fitting For Poke-Through Wiring Device"; and U.S. Pat. No. 5,257,641 patented Nov. 2, 1993 to A. J. Elsbury et al and assigned to Sentry Technologies, Inc. on a "Retrofittable Fire-Stop Device"; and U.S. Pat. No. 5,272,278 patented Dec. 21, 1993 to E. S. Wuertz and assigned to Hubbell Incorporated on a "Poke-Through Wiring Fitting With Flap Cover Assembly"; and U.S. Pat. No. 5,331,946 patented Jul. 26, 1994 to K. Yamini et al on an "Apparatus And Method For Sealing An Opening In A Fire Partition Through Which A Combustible Conduit Extends"; and U.S. Pat. No. 5,393,930 patented Feb. 28, 1995 to E. S. Wuertz and assigned to Hubbell Incorporated on a "Self-Anchoring Poke-Through Wiring Device"; and U.S. Pat. No. 5,410,103 patented Apr. 25, 1995 to E. S. Wuertz and assigned to Hubbell Incorporated on a "Self-Anchoring Poke-Through Wiring Device"; and U.S. Pat. No. 5,421,127 patented Jun. 6, 1995 to S. F. Stefely on a "Fire Stop Closure"; and U.S. Pat. No. 5,452,551 patented Sep. 26, 1995 to P. J. Charland et al and assigned to Minnesota Mining and Manufacturing Company on a "Tiered Firestop Assembly"; and U.S. Pat. No. 5,456,050 patented Oct. 10, 1995 to T. T. Ward and assigned to Construction Consultants & Contractors, Inc. on a "System To Prevent Spread Of Fire And Smoke Through Wall-Breaching Utility Holes"; and U.S. Pat. No. 5,467,565 patented Nov. 21, 1995 to T. Bowman et al and assigned to Walker Systems, Inc. on a "Method And Apparatus For Improved Activation Of Services In An Office Building Floor"; and U.S. Pat. No. 5,594,202 patented Jan. 14, 1997 to Michael A. Tobias on a "Split Sleeve System"; and U.S. Pat. No. 5,641,940 patented Jun. 24, 1997 to J. H. Whitehead and assigned to Thomas & Betts Corporation on a "Poke-Through Electrical Connection Assembly Retainer"; and U.S. Pat. No. 5,661,891 patented Sep. 2, 1997 to A. J. Miller et al on a "Method Of Passing Wires Through A Firewall Using Telescoping Conduit Assembly"; and U.S. Pat. No. 5,696,349 patented Dec. 9, 1997 to J. Bera and assigned to Raceway Components, Inc. on a "Wedge-Lockable Fire-Retardant Poke-Through Service Fitting"; and U.S. Pat. No. 5,729,938 patented Mar. 24, 1998 to M. A. Tobias on a 'Wall Penetrator Sleeve System"; and U.S. Pat. No. 5,740,698 patented Apr. 21, 1998 to D. J. Myronuk et al on a "Flame Attenuator For Poke-Through Constructions"; and U.S. Pat. No. 5,747,732 patented May 5, 1998 to J. Bera et al and assigned to Raceway Components, Inc. on a "Fire-Rated Furniture Feed Poke-Through Fitting"; and U.S. Pat. No. 5,814, 764 patented Sep. 29, 1998 to J. E. Kohaut and assigned to Raceway Components, Inc. on an "Insert For Poke-Through Fitting"; and U.S. Pat. No. 5,830,319 patented Nov. 3, 1998 to H. V. Landin and assigned to Minnesota Mining and Manufacturing on a "Flexible Fire Barrier Felt"; and U.S. Pat. No. 5,953,872 patented Sep. 21, 1999 to G. S. MacMillian et al on a "Fire Barrier Assembly"; and U.S. Pat. No. 5,974,750 patented Nov. 2, 1999 to H. V. Landin et al and assigned to 3M Innovative Properties Company on a "Fire Barrier Protected Dynamic Joint"; and U.S. Pat. No. 6,018,126 patented Jan. 25, 2000 to N. Castellani et al and assigned to Walker Systems, Inc. on a "Flush Poke-Through Wiring Fitting"; and U.S. Pat. No. 6,112,488 patented Sep. 5, 2000 to J. R. Olson et al and assigned to Unifrax Corporation on "Fire Barrier Material and Gaskets Therefor"; and U.S. Pat. No. 6,114,623 patented Sep. 5, 2000 to N. Bonilla et al and assigned to Hubbell Incorporated on a "Poke-Through Floor Fitting"; and U.S. Pat. No. 6,141,915 patented Nov. 7, 2000 to T. Andersen et al on a "Fire Resistant Bushing For Cables, Pipes and Channels"; and U.S. Pat. No. 6,153,668 patented Nov. 28, 2000 to R. E. Gestner et al and assigned to 3M Innovative Properties Company on a "Low Density Fire Barrier Material And Method Of Making"; and U.S. Pat. No. 6,158,180 patented Dec. 12, 2000 to J. R. Edwards and assigned to Office Speciality Inc. on a "Mounting Device For Communications Conduit Connector"; and U.S. Pat. No. 6,175,078 patented Jan. 16, 2001 to S. S. Bambardekar et al and assigned to Walker Systems, Inc. on a "Flush Poke-Through Wiring Fitting Having A Height Adjustable Data Jack Mounting Bracket"; and U.S. Pat. No. 6,176,052 patented Jan. 23, 2001 to J. Takahashi and assigned to Tosetz Co., Ltd. on a "Fire Retarding Division Penetrating Member"; and U.S. Pat. No. 6,180,882 patented Jan. 30, 2001 to C. T. Dinh and assigned to Thomas & Betts, International on a "Single And Dual Cable Seal System"; and U.S. Pat. No. 6,307,152 patented Oct. 23, 2001 to N. Bonilla et al and assigned to Hubbell Incorporated on a "Poke-Through Floor Fitting"; and U.S. Pat. No. 6,353,180 patented Mar. 5, 2002 to J. V. DeBartolo, Jr. et al and assigned to Hubbell Incorporated on "Bus Bars For Poke-Through Floor Fitting"; and U.S. Pat. No. 6,360, 502 patented Mar. 6, 2002 to J. P. Stahl, Jr. and assigned to Specified Technologies Inc. on a "Firestop Collar Means With Improved Mounting Means"; and U.S. Patent Publication No. 2002/0032996 published Mar. 21, 2002 to K. R. Cornwall on a "Coupling Assembly With Intumescent Material"; and U.S. Patent Publication No. 2003/0051423 published Mar. 20, 2003 to H. Munzenberger on a "Tubular Lead-In Fixture"; and U.S. Pat. No. 6,536,169 patented Mar. 25, 2003 to M. G. Dykhoff and assigned to 3M Innovative Properties Company on an "Adjustable Rack For Supporting Firestop Material In A Through-Penetration"; and United States Patent Publication No. 2004/0016191 published Jan. 29, 2004 to Larry Whitty on an "Intumescent Floor Opening Frame"; and U.S. Pat. No. 6,732,481 patented May 11, 2004 to James P. Stahl, Sr. and assigned to Specified Technologies Inc. on an "Intumescent Firestopping Apparatus"; and U.S. Pat. No. 6,848,227 patented Feb. 1, 2005 to L. Whitty and assigned to Royal Group Technologies Limited on an "Intumescent Floor Opening Frame"; and U.S. Pat. No. 6,928,777 patented Aug. 16, 2005 to R. L. Cordts and assigned to 3M Innovative Properties Company on a "Method And Apparatus For Firestopping A Through-Penetration"; and U.S. Pat. No. 6,969,799 patented Nov. 29, 2005 to D. L. Snyder and assigned to SGC Technologies L.L.C. on a "Poke Through"; and United States Patent Publication No. 2006/0138251 published Jun. 29, 2006 to J. P. Stahl, Sr. on a "Self-Adjusting Intumescent Firestopping Apparatus"; and U.S. Pat. No. 7,373,761 patented May 20, 2008 to J. P. Stahl, Sr. and assigned to Specified Technologies Inc. on a "Self-Adjusting Intumescent Firestopping Apparatus"; and U.S. Pat. No. 7,523,590 patented Apr. 28, 2009 to J. P. Stahl, Sr. and assigned to Specified Technologies Inc. on an "Intumescent Firestopping Apparatus and Method"; and U.S. Pat. No. 7,581,362 patented Sep. 1, 2009 to J. A. Vaughan and assigned to METIS Holdings on a "Conduit With Adjustable Length And Fire Collar"; and U.S. Pat. No. 7,681,365 patented Mar. 23, 2010 to J. A. Klein on "Head-Of-Wall Fireblock Systems And Related Wall Assemblies"; and U.S. Pat. No. 7,694,474 patented Apr. 13, 2010 to J. P. Stahl, Sr. et al and assigned to Specified Technologies Inc. on a "Method and Apparatus For Firestopping Around A Water Closet Drain Pipe In A Vertical Floor Opening"; and U.S. Pat. No. 7,762, 032 patented Jul. 27, 2010 to J. M. Frenkel and assigned to One Smart Chick, LLC on "Systems And Methods For Providing A Utility Line Protection Plate"; and U.S. Pat. No. 7,814,718 patented Oct. 19, 2010 to J. A. Klein on "Head-Of-Wall Fireblocks"; and U.S. Pat. No. 7,866,108 patented Jan. 11, 2011 to J. A. Klein on "Head-Of-Wall Fireblock Systems and Related Wall Assemblies"; and U.S. Pat. No. 7,913,468 patented Mar. 29, 2011 to G. A. Spais on a "Collar For Increasing T-Ratings And Performance Of Firestop Systems"; and U.S. Pat. No. 7,950,198 patented May 31, 2011 to D. A. Pilz et al and assigned to California Expanded Metal Products Company on a "Fire-Rated Wall Construction Product"; and U.S. Pat. No. 8,006,447 patented Aug. 30, 2011 to J.

A. Beele and assigned to Beele Engineering B.V. on "Fire-Resistant Foam, Construction Elements Therefrom, System For Fire-Tight Sealing Of An Opening, and Method For Sealing an Opening In A Wall"; and U.S. Pat. No. 8,056,293 patented Nov. 15, 2011 to J. A. Klein on "Head-Of-Wall Fireblock Systems and Related Wall Assemblies"; and U.S. Pat. No. 8,087,205 patented Jan. 3, 2012 to D. A. Pilz et al and assigned to California Expanded Metal Products Company on a "Fire-Rated Wall Construction Product"; and U.S. Pat. No. 8,132,376 patented Mar. 13, 2012 to D. A. Pilz et al and assigned to California Expanded Metal Products Company on a "Two-Piece Track System"; and U.S. Pat. No. 8,136,314 patented Mar. 20, 2012 to J. A. Klein on "Head-Of-Wall Fireblocks"; and U.S. Design Pat. No. D657,232 patented Apr. 10, 2012 to James P. Stahl, Sr. et al and assigned to Specified Technologies, Inc. on a "Firestopping Bushing Made From Two Separate Identical Parts"; and U.S. Pat. No. 8,151,526 patented Apr. 10, 2012 to J. A. Klein on "Head-of-Wall Fireblock Systems And Related Wall Assemblies"; and U.S. Pat. No. 8,281,552 patented Oct. 9, 2012 to D. A. Pilz et al and assigned to California Expanded Metal Products Company on an "Exterior Wall Construction Product"; and U.S. Pat. No. 8,322,094 patented Dec. 4, 2012 to D. A. Pilz et al and assigned to California Expanded Metal Products Company on a "Fire-Rated Wall And Ceiling System"; and U.S. Reissue Pat. No. RE43,997 patented Feb. 19, 2013 to J. P. Stahl, Sr. and assigned to Specified Technologies Inc. on an "Intumescent Firestopping Apparatus"; and U.S. Reissue Pat. No. 44,033 patented Mar. 5, 2013 to J. P. Stahl, Sr. and assigned to Specified Technologies Inc. on an "Intumescent Firestopping Apparatus"; and U.S. Pat. No. 8,397,452 patented Mar. 19, 2013 to J. P. Stahl, Sr. et al and assigned to Specified Technologies Inc. on a "Firestopping Bushing".

SUMMARY OF THE INVENTION

The present invention provides a protective conduit for a structural panel which can be positioned in a panel opening in a building defined in a panel assembly therein such as a ceiling, wall or floor where penetrating members will extend therethrough. Such panel assemblies commonly include a first panel and a second panel often of wallboard which are spaced apart from one another with structurally supporting studs positioned therebetween. The protective conduit is for preventing the transmission of fire, heat, smoke and sound through the protective conduit.

The construction of the protective conduit includes an outer housing assembly comprising a first outer shell having a first outer shell attachment means and a first outer shell inlet. The first outer shell further includes a first outer shell duct in fluid flow communication with respect to the first outer shell inlet. A first outer shell outlet is also defined spatially disposed from the first outer shell inlet such that it is in fluid flow communication with respect to the first outer shell duct and the first outer shell inlet.

The outer housing assembly further includes a second outer shell including a second outer shell attachment means securable with respect to the first outer shell attachment means to attach the second outer shell with respect to the first outer shell. The second outer shell further includes a second outer shell inlet positionable adjacent to the first outer shell inlet to define therewith an outer housing inlet responsive to attachment between the first outer shell attachment means and the second outer shell attachment means. The second outer shell also includes a second outer shell duct in flow communication with respect to the first outer shell inlet and being positionable adjacent to the first outer shell duct to define therewith an outer housing duct responsive to attachment between a first outer shell attachment means and a second outer shell attachment means. Furthermore, a second outer shell additionally includes a second outer shell outlet spatially disposed from the first outer shell inlet and in fluid flow communication with respect to the first outer shell duct and the first outer shell inlet. It is positionable adjacent to the first outer shell outlet to define therewith an outer housing outlet responsive to attachment between the first outer shell attachment means and the second outer shell attachment means.

The protective conduit further defines an inner housing assembly including a first inner shell which includes a first inner shell attachment means and a first inner shell inlet. A first inner shell duct is also defined by the inner housing which is in fluid flow communication with respect to the first inner shell inlet. The inner housing assembly further defines a first inner shell outlet spatially disposed from the first inner shell inlet such as to be in full fluid flow communication with respect to the first inner shell duct and the first inner shell inlet. The inner housing assembly further defines a second inner shell which includes a second inner shell attachment means securable with respect to the first inner shell attachment means to attach the second inner shell to the first inner shell. The second inner shell also defines a second inner shell inlet positionable adjacent to the first inner shell inlet to define therewith an inner housing inlet responsive to attachment between the first inner shell attachment means and the second inner shell attachment means. The second inner shell further includes a second inner shell duct in fluid flow communication with respect to the first inner shell inlet and positionable adjacent to the first inner shell duct in order to define therewith an inner housing duct responsive to attachment between the first inner shell attachment means and the second inner shell attachment means. This inner housing duct will also define an axial corridor extending therethrough to receive and retain penetrating members extending therethrough. The second inner shell further defines second inner shell outlet spatially disposed from the first inner shell inlet and in fluid flow communication with respect to the first inner shell duct and the first inner shell inlet. It is also positionable adjacent to the first inner shell outlet in such a manner as to define therewith an inner housing outlet responsive to attachment between the first inner shell attachment means and the second inner shell attachment means.

The protective conduit of the present invention further includes a duct sealing means for inhibiting the movement of fire, heat, smoke and sound through the inner housing duct along the axial corridor. This duct sealing means includes a first sealing member for sealing adjacent the first inner shell. This first sealing member includes a first sealing member attachment means for attaching the first sealing member with respect to the first inner shell thereadjacent. The first sealing member also includes a first abutting panel extending across the axial corridor and a first inlet inclined panel attached to the first abutting panel and extending outwardly therefrom obliquely toward the first inner shell inlet. The first sealing member further includes a first outlet inclined panel attached to the first abutting panel and extending outwardly therefrom obliquely toward the first outer shell inlet. The first sealing member further includes a first sealing member lip extending peripherally around the first abutting panel, the first inlet inclined panel and the first outlet inclined panel. The first sealing member further includes a first outwardly projecting lip section extending outwardly from the first sealing member. This first outwardly projecting lip section is positioned in abutting engagement with respect to the outer shell assembly to provide frictional resistance to relative telescoping movement of the inner shell assembly with respect to the outer shell assembly.

The duct sealing means further includes a second sealing member for sealing adjacent the second inner shell. This second sealing member includes a second sealing member attachment means for attaching the second sealing member with respect to the inner shell thereadjacent. A second abutting panel is included in the construction of the second sealing member which extends across the axial corridor and is adapted to abut along the first abutting panel responsive to attachment of the first inner shell with respect to the second inner shell. The second sealing member also includes a second inlet inclined panel attached to the second abutting panel and extending outwardly therefrom obliquely toward the second inner shell inlet means. This second inlet inclined panel is spatially disposed from the first inlet inclined panel.

The second sealing member further includes a second outlet inclined panel attached to the second abutting panel and extending outwardly therefrom obliquely toward the second outer shell inlet. The second outlet inclined panel is spatially disposed from the first outlet inclined panel. The second sealing member further includes a second sealing member lip extending peripherally around the second abutting panel, the second inlet inclined panel and the second outlet inclined panel. The second sealing member further includes second outwardly projecting lip section extending outwardly from the second sealing member. This second outwardly projecting lip section is positioned in abutting engagement with respect to the outer shell assembly to provide frictional resistance to relative telescoping movement of the inner shell assembly with respect to the outer shell assembly.

It is an object of the protective conduit for a structural panel opening of the present invention usable as an after-market device for placement at existing locations where penetrating members are already positioned extending through walls, ceiling and/or floors.

It is an object of the present invention to provide a protective conduit for a structural panel opening which provides limited fire resistance and some resistance to the movement of sound, smoke, heat and flames therethrough while being of minimal cost.

It is an object of the protective conduit for a structural panel opening of the present invention to be easily maintained at a minimal cost.

It is an object of the protective conduit for a structural panel opening of the present invention to be easy to install and maintain.

It is an object of the protective conduit for a structural panel opening of the present invention to be of limited initial capital cost while being useful in a great variety of different types of applications.

It is an object of the protective conduit for a structural panel opening of the present invention to be particularly usable in non-fire rated wall, ceiling or floor applications where acoustic insulation is needed.

It is an object of the protective conduit for a structural panel opening of the present invention to have an overall construction which can be very quickly and easily installed by technicians having only moderate levels of training.

It is an object of the protective conduit for a structural panel opening of the present invention to be longitudinally adjustable to facilitate customized usage with walls having a great variety of different lateral thicknesses.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
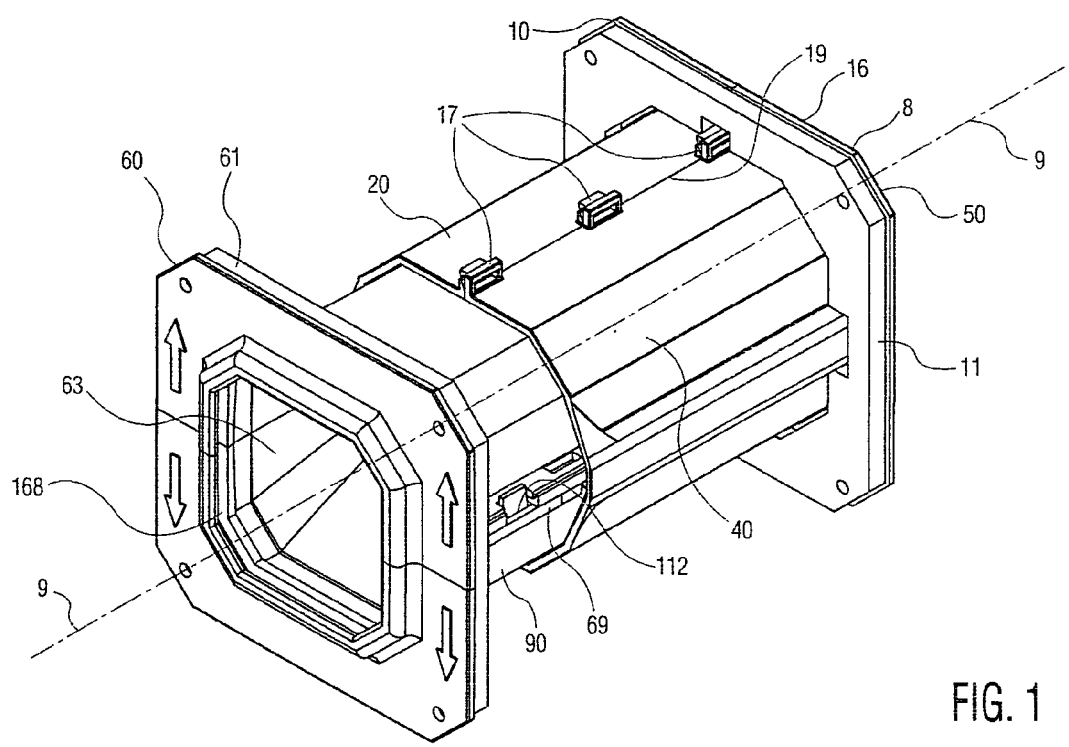
FIG. 1 is a front perspective illustration of an embodiment of the protective conduit for a structural panel opening shown fully assembled with the inner housing assembly positioned extending into the outer housing assembly at an intermediate position therewithin.
Figure 2:
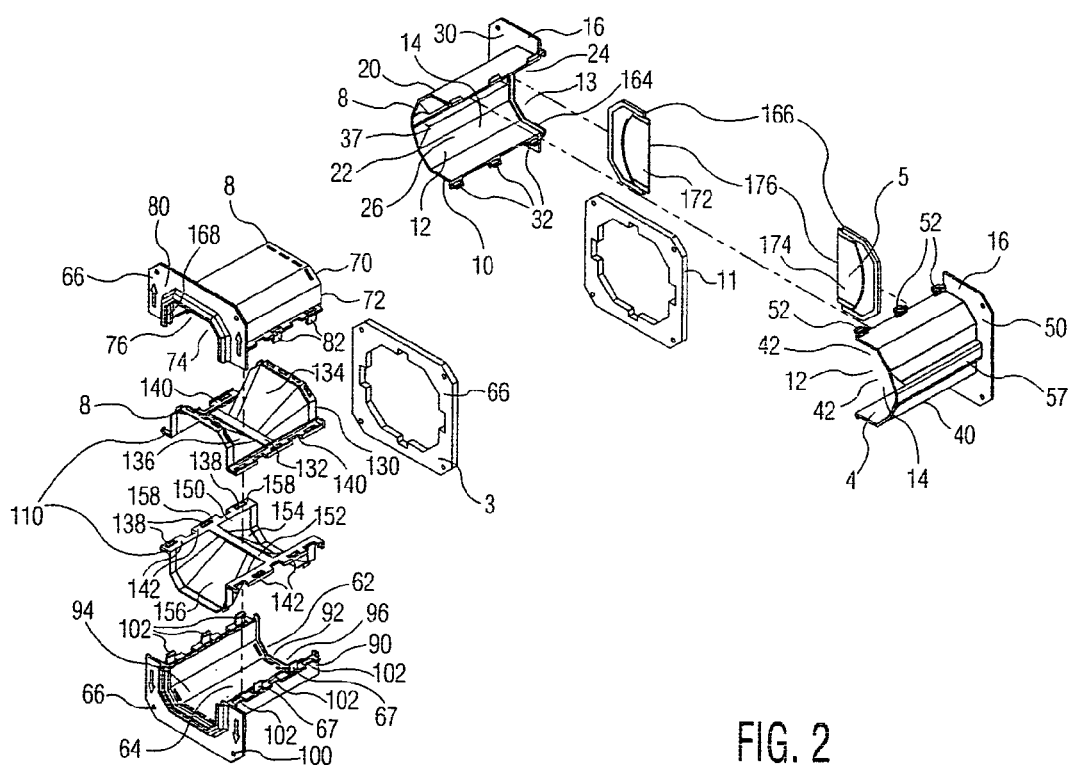
FIG. 2 is a front perspective illustration of an embodiment of the protective conduit for a structural panel opening shown exploded to facilitate clarity in the identification of the internal portions thereof.
Figure 3:
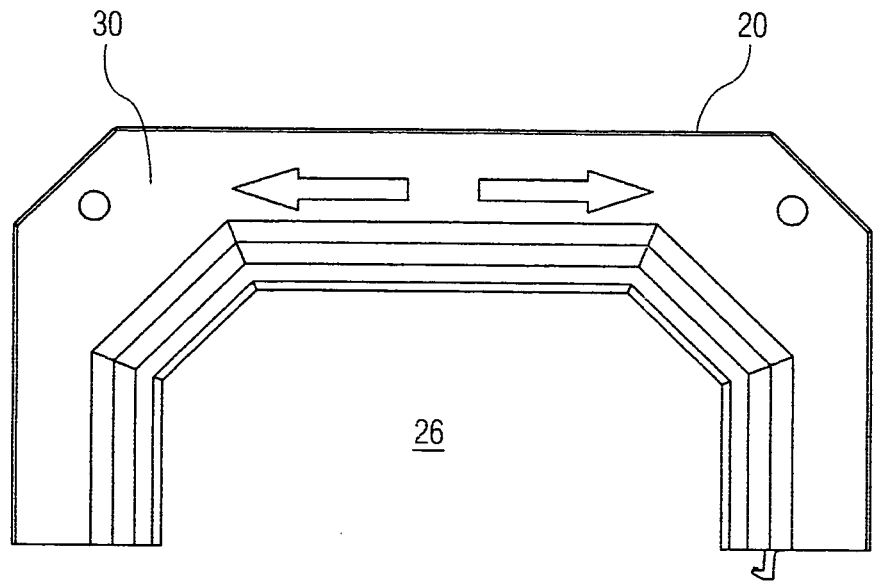
FIG. 3 is a front plan view of an embodiment of a first outer shell of the present invention.
Figure 4:
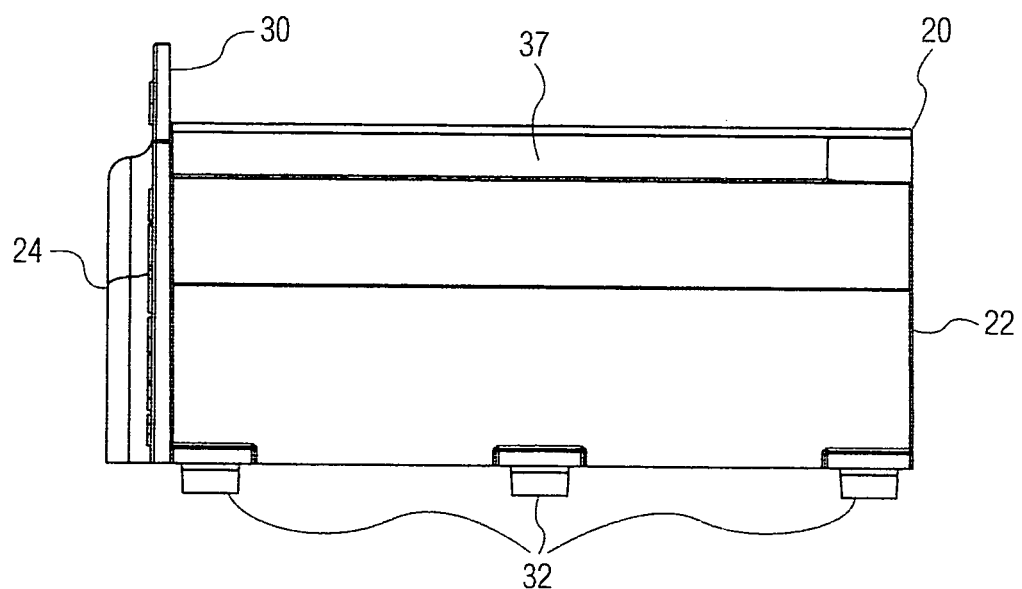
FIG. 4 is a right side plan view of an embodiment of the first outer shell of the present invention as shown in FIG. 3.
Figure 5:
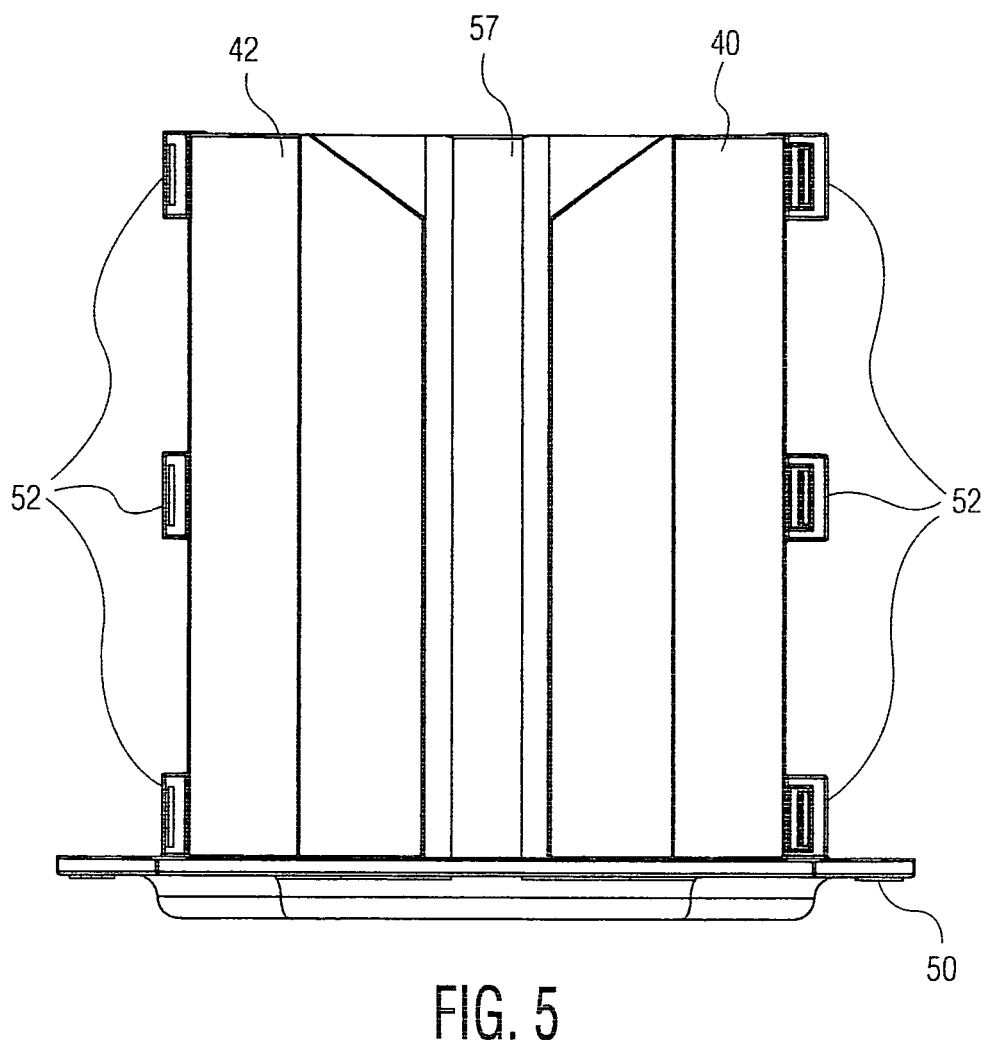
FIG. 5 is a top plan view of an embodiment of the second outer shell of the present invention.
Figure 6:
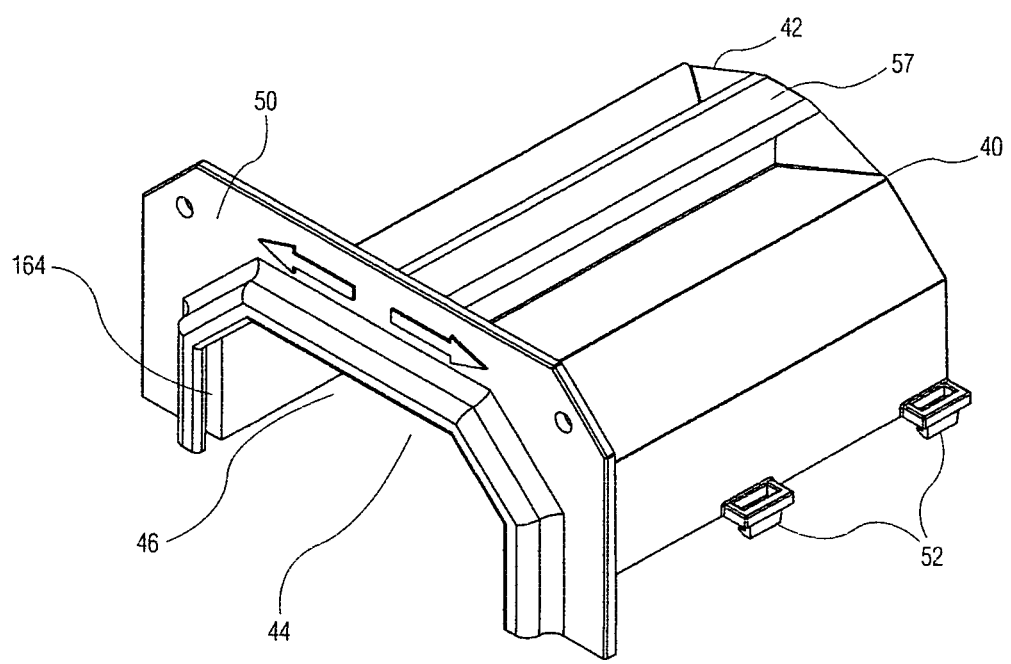
FIG. 6 is an isometric perspective illustration of the embodiment of the first outer shell of the present invention as shown in FIG. 5.
Figure 7:
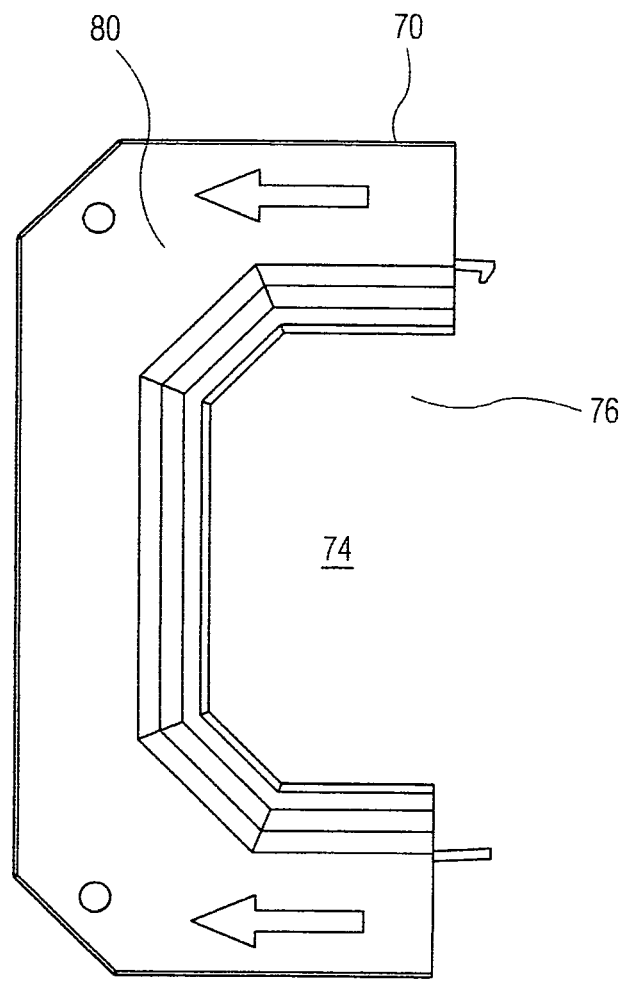
FIG. 7 is a front plan view of an embodiment of a first inner shell of the present invention.
Figure 8:
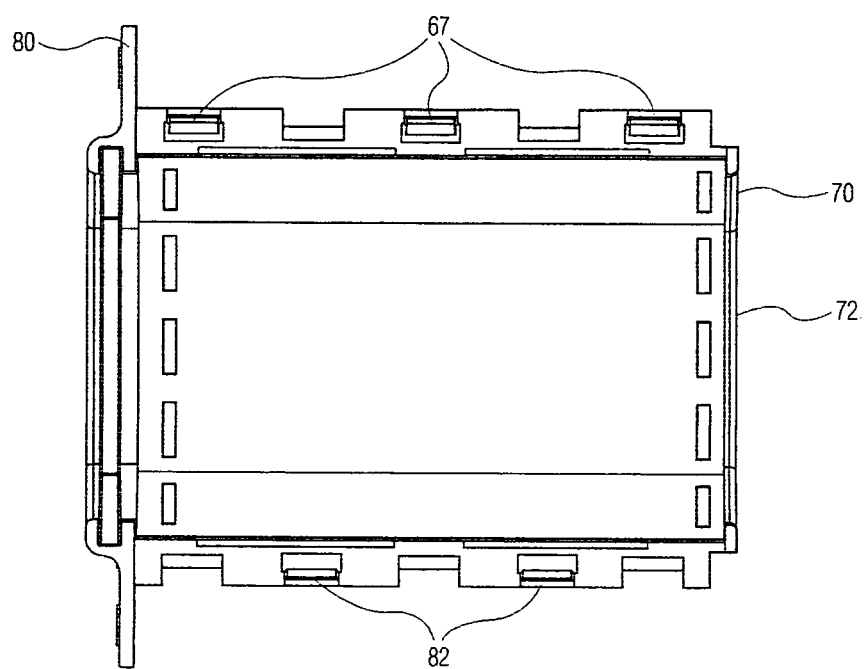
FIG. 8 is a right side plan view of an embodiment of a first inner shell of the present invention.
Figure 9:
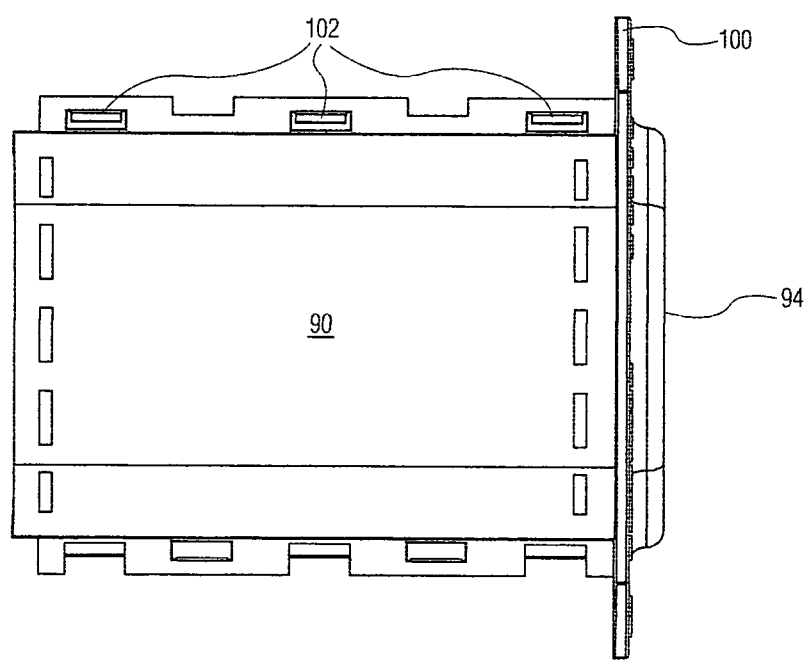
FIG. 9 is a left side plan view of an embodiment of a second inner shell of the present invention.
Figure 10:
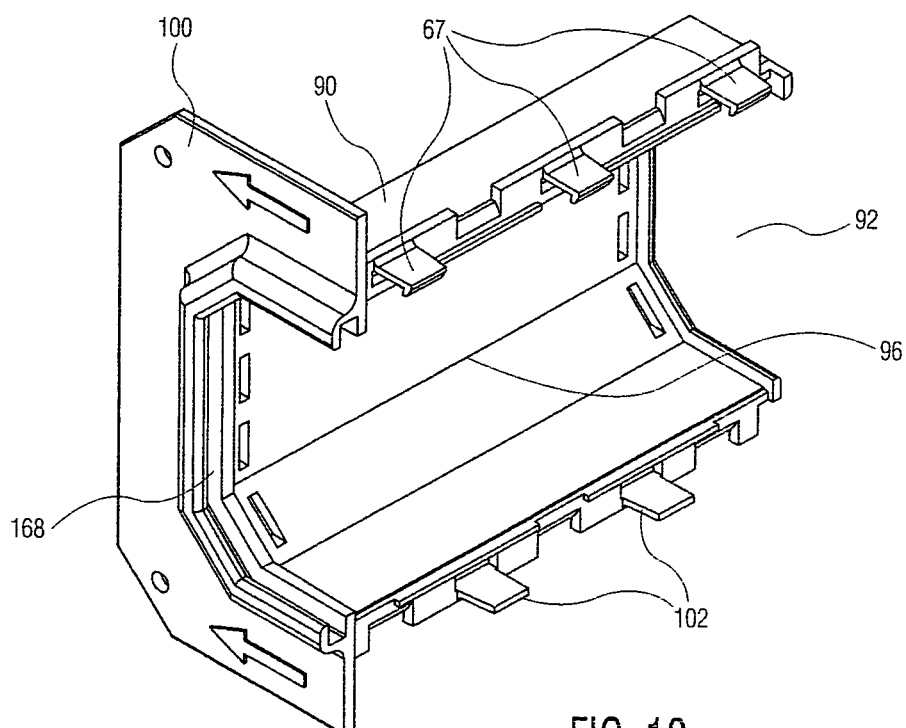
FIG. 10 is an isometric perspective illustration of an embodiment of a second inner shell of the present invention.
Figure 11:
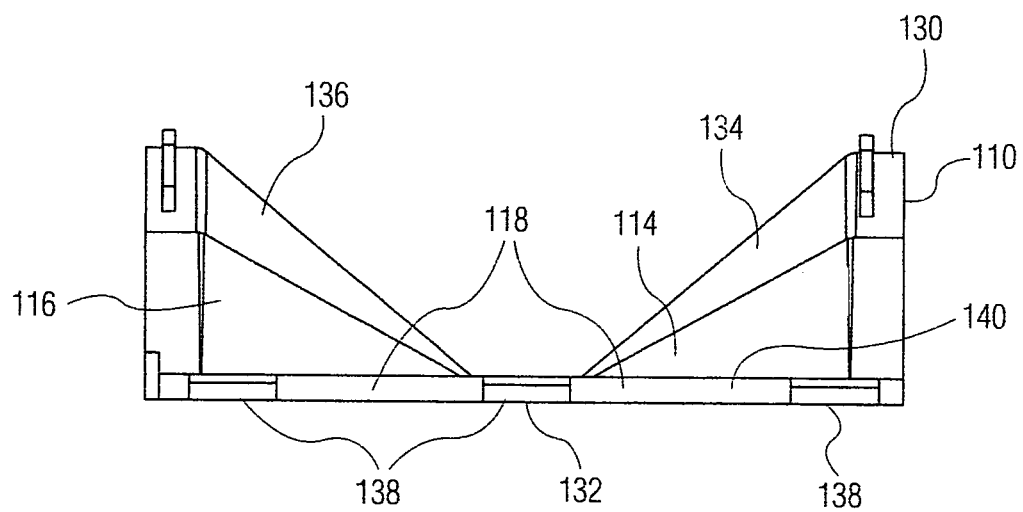
FIG. 11 is a front plan view of an embodiment of a first sealing member of the present invention.
Figure 12:
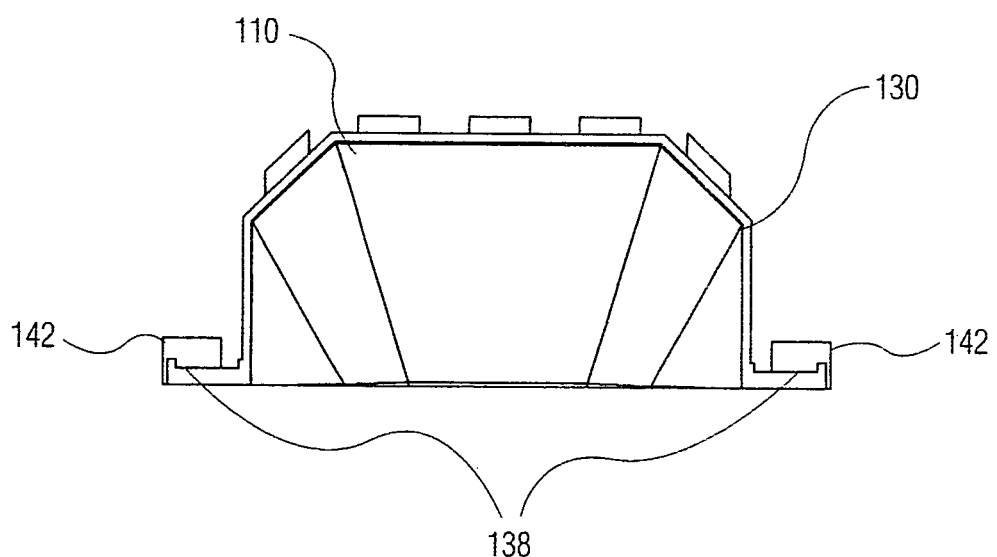
FIG. 12 is a right side plan view of an embodiment of a first sealing member of the present invention.
Figure 13:
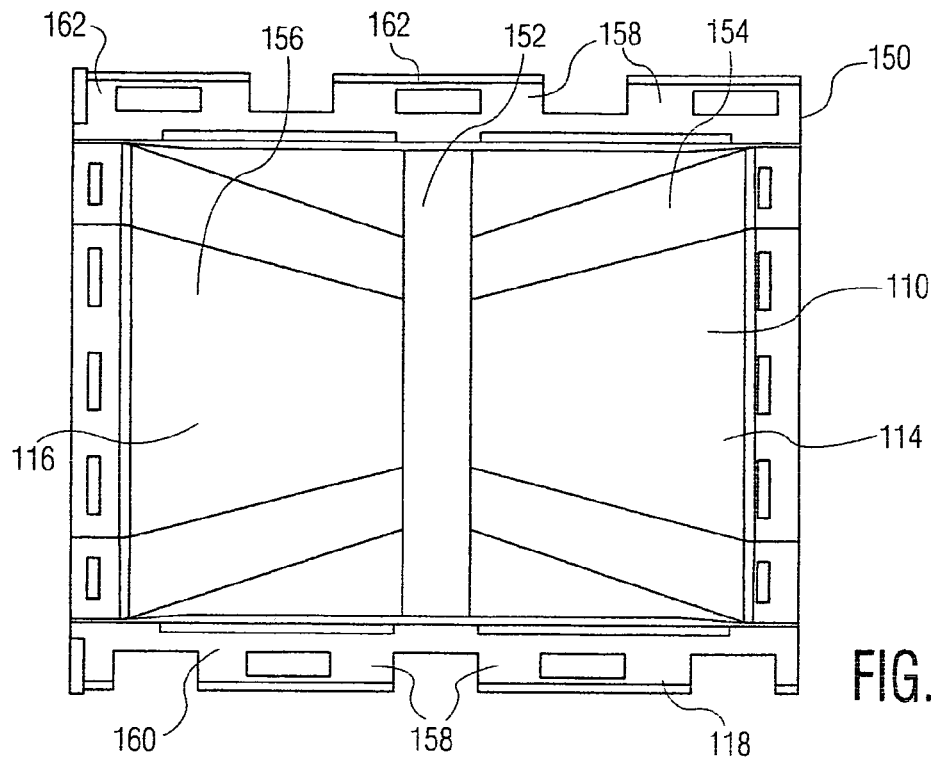
FIG. 13 is a top plan view of an embodiment of a second sealing member of the present invention.
Figure 14:
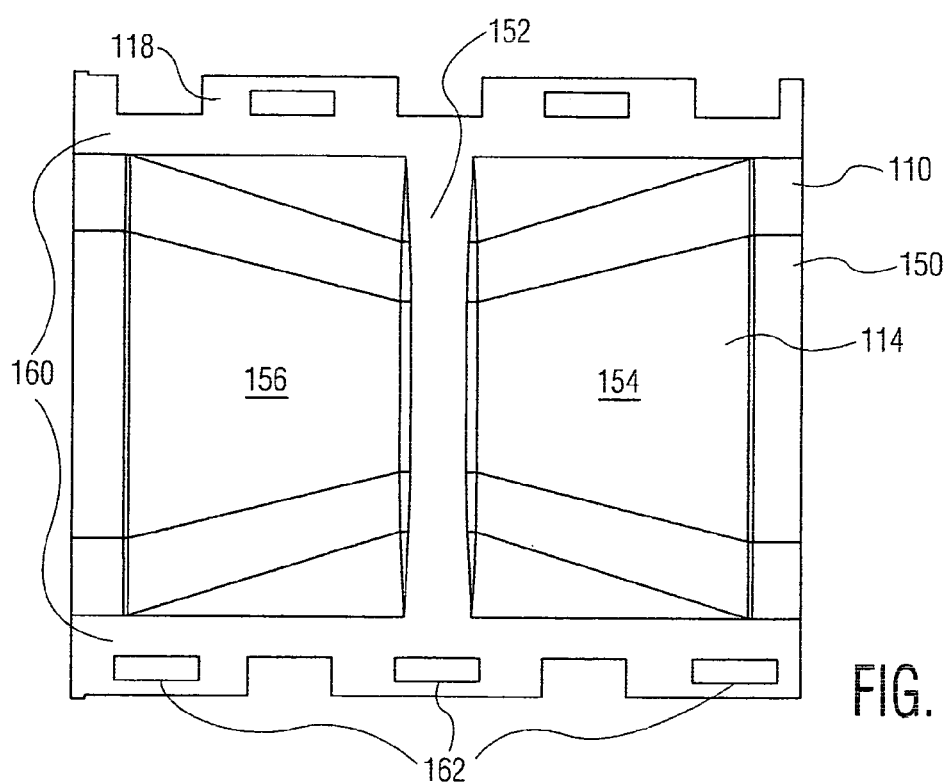
FIG. 14 is a bottom plan view of an embodiment of a second sealing member of the present invention.
Figure 15:
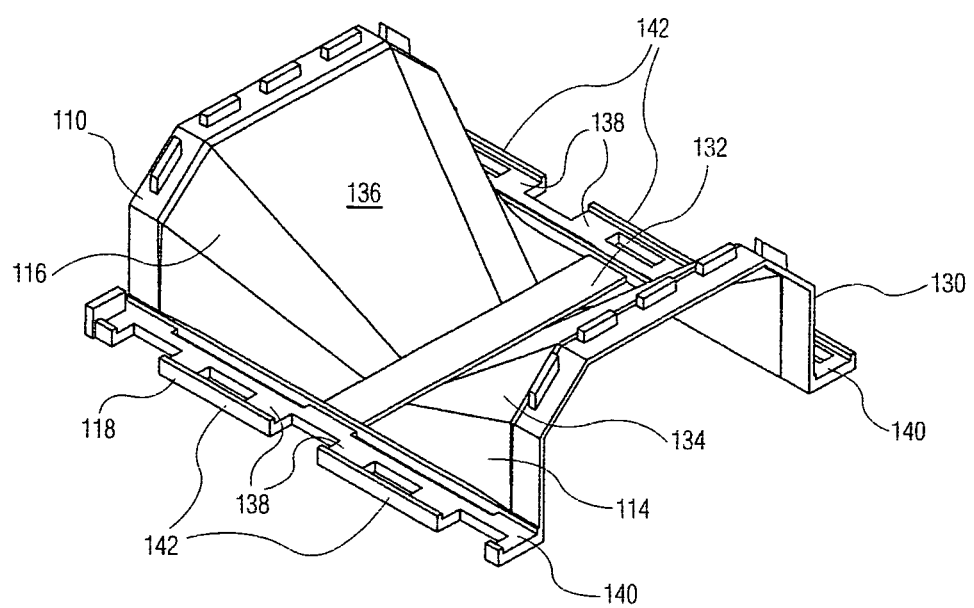
FIG. 15 is an isometric perspective illustration of an embodiment of a first sealing member of the present invention.
Figure 16:
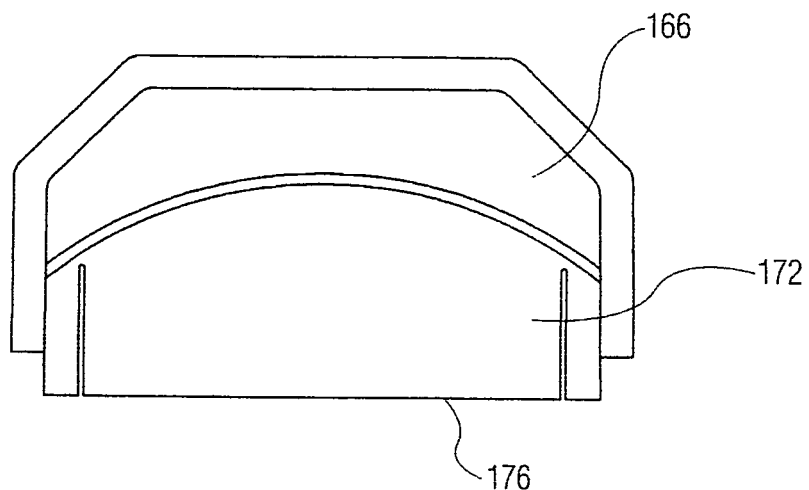
FIG. 16 is a front plan view of an embodiment of a first curtain seal panel of the present invention.
Figure 17:
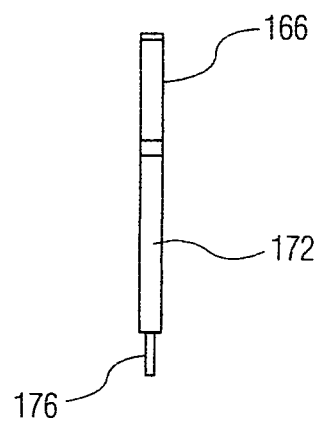
FIG. 17 is a right side plan view of an embodiment of a second curtain seal panel of the present invention.
Figure 18:
FIG. 18 is a bottom plan view of an embodiment of a second curtain seal panel of the present invention.
Figure 19:
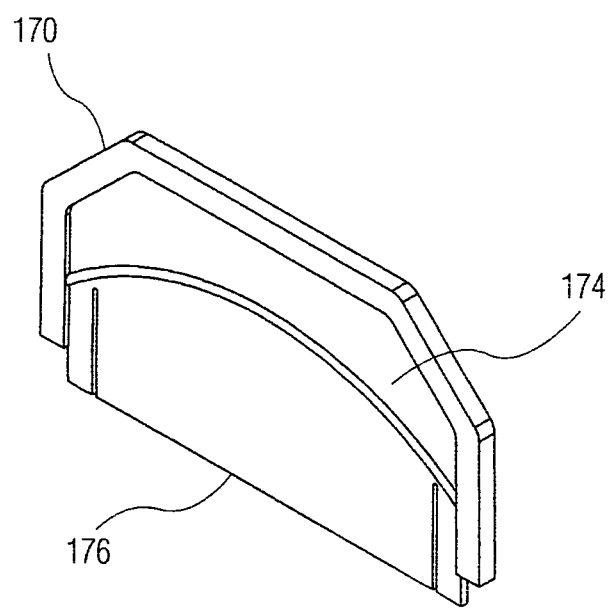
FIG. 19 is an isometric perspective illustration of an embodiment of a second curtain seal panel of the present invention.
Figure 20:
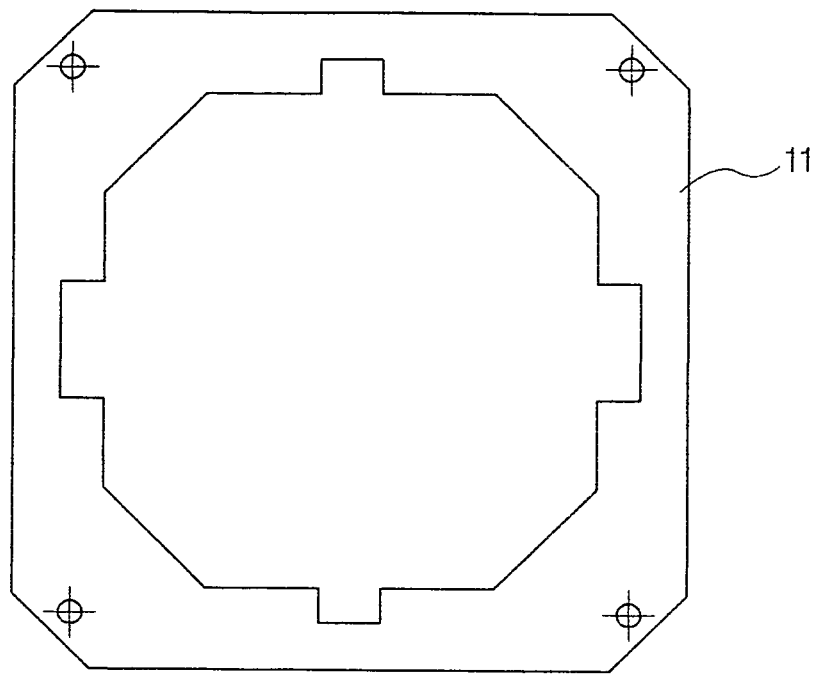
FIG. 20 is a front plan view of an embodiment of an outer housing flange gasket of the present invention.
Figure 21:
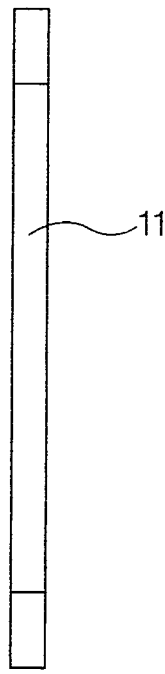
FIG. 21 is a right side plan view of an embodiment of an outer housing flange gasket of the present invention.
Figure 22:
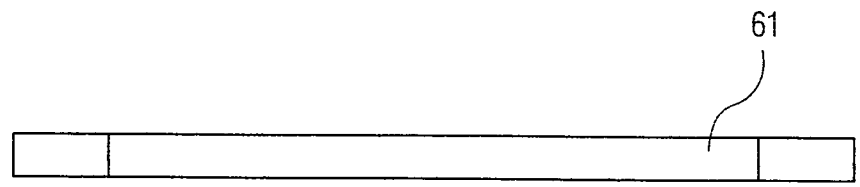
FIG. 22 is a top plan view of an embodiment of an inner housing flange gasket of the present invention.
Figure 23:
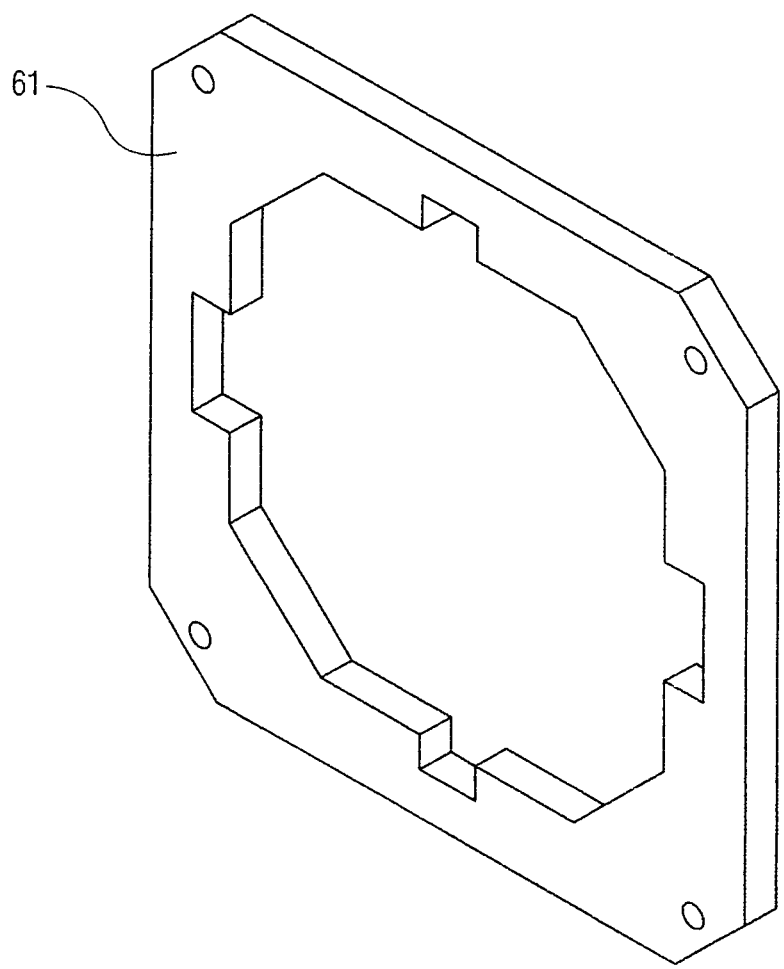
FIG. 23 is an isometric perspective illustration of an embodiment of an inner housing flange gasket of the present invention.
Figure 24:
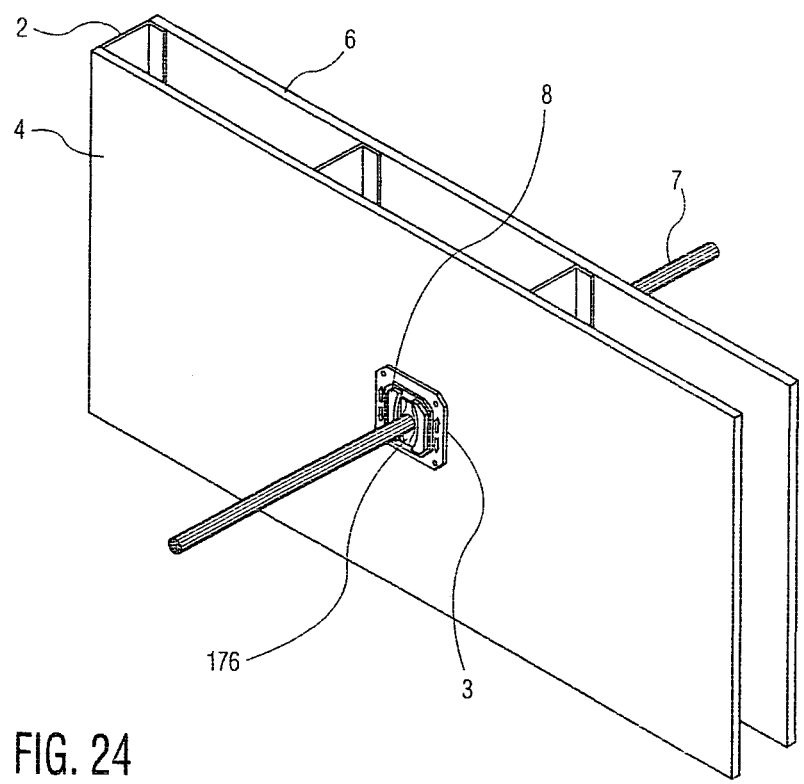
FIG. 24 is an isometric view of an embodiment of the present invention illustrating a protective conduit shown positioned passing through a panel assembly, particularly a wall assembly.
Figure 25:
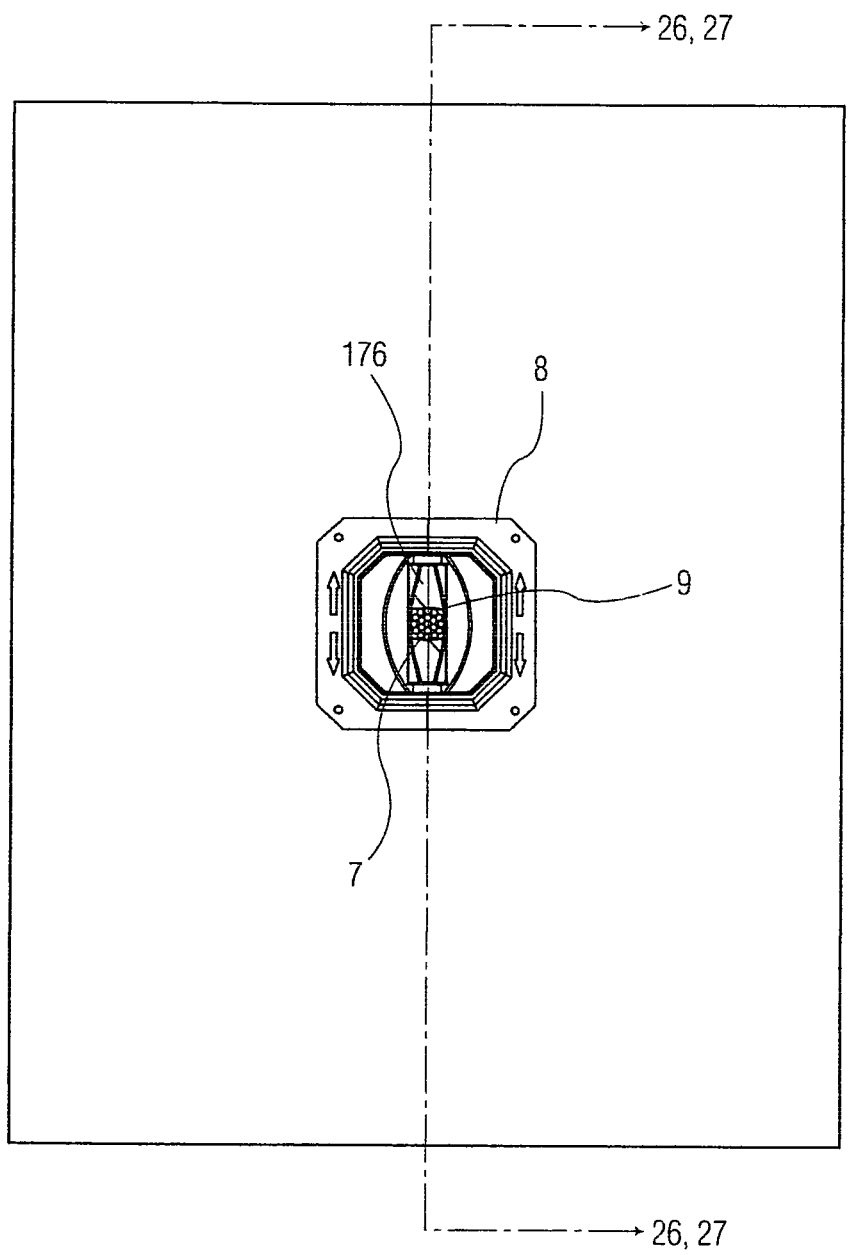
FIG. 25 is a front plan view of an embodiment of the protective conduit of the present invention shown positioned fully installed within a panel opening.
Figure 26:
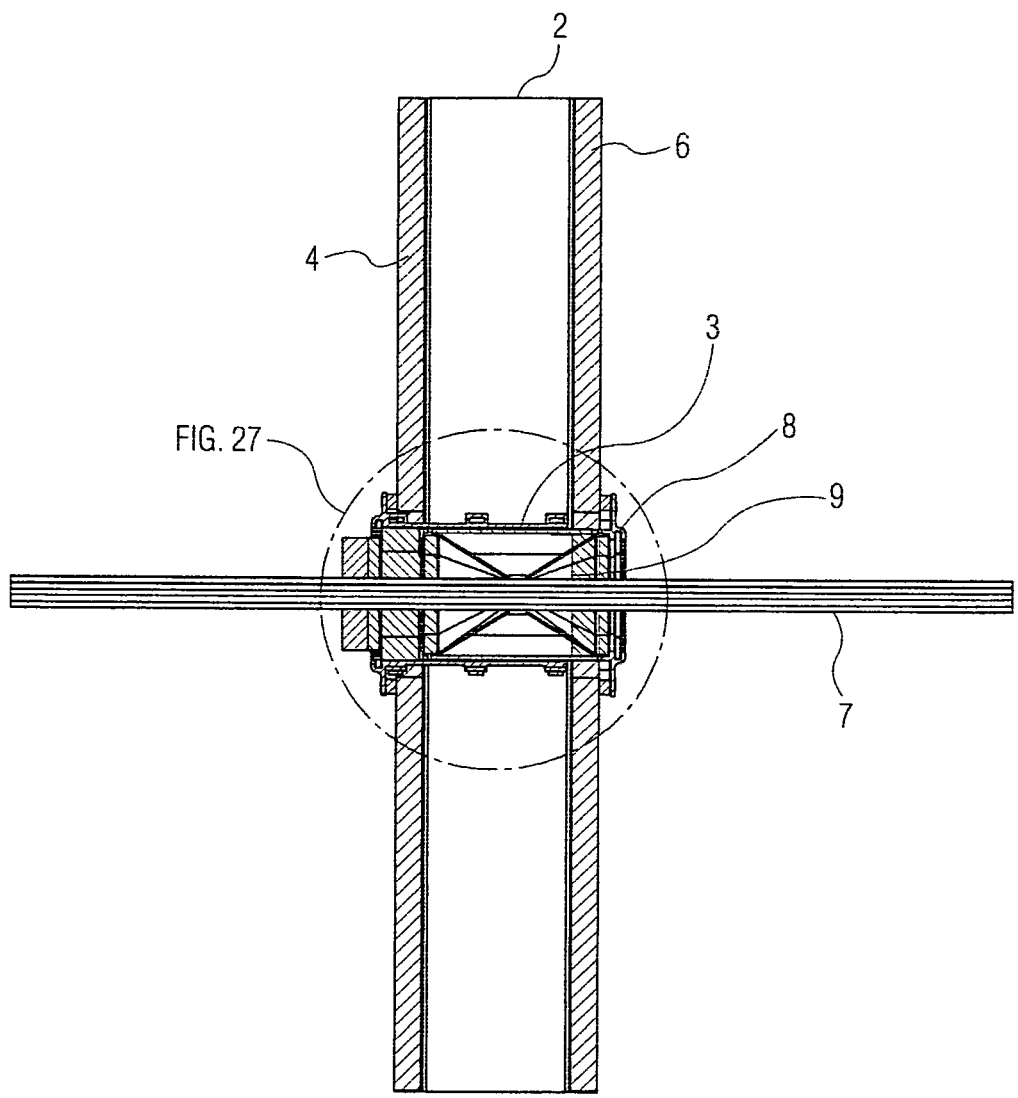
FIG. 26 is a right side cross-sectional view showing an embodiment of the protective conduit of the present invention shown positioned passing through a panel assembly, particularly a wall assembly.
Figure 27:
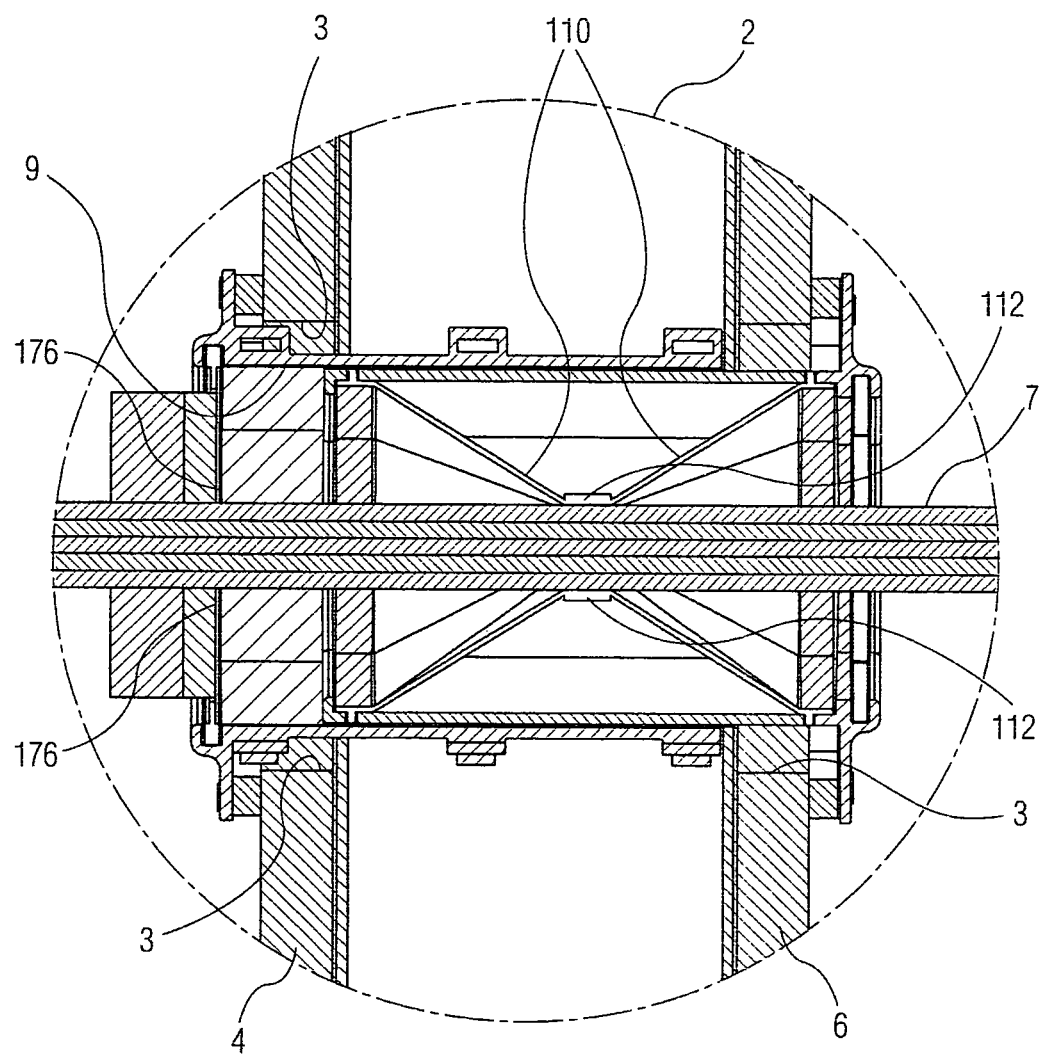
FIG. 27 is an enlarged view of the illustration shown in FIG. 26 for facilitating viewing of the smaller parts thereof in greater detail.

The protective conduit or pathway 8 of the present invention is designed to extend through a panel assembly 2 which defines a panel opening 3 extending therethrough. Normally such a panel assembly 2 will include a first panel 4 and a second panel 6 spatially disposed with respect to one another. Such panels are commonly made of wallboard or gypsum board. The first panel 4 and the second panel 6 will usually be spatially disposed from one another by studs or other structural wall elements which are commonly used in forming walls, floor and ceilings in commercial or residential buildings.

The conduit 8 of the present invention provides a means for providing a lower level of fireproofing or for protection from smoke or heat through the panel assembly 2 for those particular panel assemblies 2 which are not fire-rated, that is, which do not have predefined fireproofing requirements for all fixtures used for sealing openings therethrough. With fire-rated walls, the use of intumescent materials or other high level firestopping materials for fixtures defining pathways therethrough is often required. However, in situations where the wall is not required to be fire-rated, the construction of the present invention provides a unique protective conduit which has a limited level of fire resistance and is also somewhat resistant to the movement of heat or smoke therethrough. Fire-rated collars or other fixtures with similar properties are somewhat more expensive than collars usable in non-fire-rated applications. The present invention provides an alternative for those situations where fire rating is not required some lower level of resistance to fire, smoke and heat is desired. The fixture of the present invention will often cost as much as 50% less than the cost of an equivalent fully-rated firestopping fixture.

In the construction of the present invention the protective conduit 8 includes an outer housing assembly 10 which defines an outer housing duct 14 extending axially therethrough. The outer housing assembly 10, preferably, includes two separate parts, namely, a first outer shell 20 and a second outer shell 40 which are attachable with respect to one another in such a manner as to define the outer housing duct 14 extending axially therethrough. The outer housing assembly 10 will define an outer housing inlet means 12 on one side of the outer housing duct 14 and will define an outer housing outlet means 13 on the other side of the outer housing duct 14. The outer housing inlet means 12 and the outer housing outlet means 13 will both be in fluid flow communication with respect to the outer housing duct 14 and, thus will be in fluid flow communication with respect to one another. By utilizing a first outer shell 20 and a second outer shell 40 for the structural members of the outer housing assembly 10, this two-part construction will allow placement of the protective conduit 8 of the present invention around penetrating members 7 which are already mounted in a position extending through any panel opening 3 already in position extending between a location on one side of a panel assembly 2 and another location on the other side of the panel assembly 2. It should be appreciated that the present invention is usable for penetrations extending through various panels including those used to define ceilings, walls and/or floors. However, for the purposes of illustration and for this specific detailed embodiment, applicants show use of the protective conduit 8 of the present invention extending through panel assemblies 2 which are wall assemblies The two-piece construction for the outer housing assembly 10 includes an outer housing attachment means 17 for detachably securing of the first outer shell 20 with respect to the second outer shell 40. Any conventional attachment construction can be utilized for this outer housing attachment means 17 such as threaded fasteners, bolt and nut configurations, locating pins or the use of adhesive or glues. The outer housing assembly 10 will also include an outer housing flange 16 surrounding the outer housing inlet means 12 such that the flange 16 can be placed into abutment with the outwardly facing surface of the first panel 4 to facilitate mounting of the outer housing assembly 10 with respect thereto. To facilitate sealing therearound an outer housing flange gasket 11 can be included which is preferably of a foam material. This outer housing flange gasket 11 is of a general round shape with an opening defined therein such that it can be positioned in abutment with the outer flange 16 at a position surrounding the outer housing outlet means 13 between flange 16 and first panel 4.

Protective conduit 8 preferably includes an inner housing assembly 60 which is movably engaged with respect to the outer housing assembly 10 of the present invention. The inner housing assembly 60 is somewhat smaller than outer housing assembly 10 and is positionable extending into the outer housing duct 14 for slidable engagement with respect thereto. Thus, the inner housing assembly 60 can extend inwardly through the outer housing outlet means 13 into the outer housing duct 14 and be slidable with respect thereto thereal-ong. The use of these two housing telescopically engaged housing assemblies 10 and 60 provides a capability for adjusting the total overall length of the protective conduit 8 in such a manner to accommodate use with wall, ceiling or floor having a wide variety of structural thicknesses.

The construction of the inner housing assembly 60 defines an inner housing duct 64 extending therethrough from an inner housing inlet means 62 to an inner housing outlet means 63. The inner housing duct 64 is preferably in registration with or aligned with respect to the outer housing duct 14 such that they extend parallel with respect to one another. In this position inner housing assembly 60 is longitudinally movable within the outer housing duct 14 of the outer housing assembly 10 since it is smaller and can fit therewithin. Thus the inner housing duct 64 and the outer housing duct 14 will be coextensive for at least a portion of the axial length thereof and will cooperate together to define an axial corridor 9 to receive penetrating members 7 extending through protective conduit 8.

The inner housing assembly 60 will preferably include an inner housing flange 66 surrounding the inner housing outlet means 63. Flange 66 is designed to be positioned in abutment with respect to the outer facing surface of the second panel 6 to be capable of securement and/or abutment with respect thereto for sealing therearound. To facilitate sealing, an inner housing flange gasket 61 is preferably included positionable between the inner housing flange 66 and the outer facing surface of the second panel 6. Inner housing flange gasket is, preferably, of identical construction to outer housing flange gasket 11 such that identical parts are usable for either gasket 11 or gasket 61.

It is also preferable that the inner housing assembly 60 be formed in two separate parts somewhat analogous to the construction of the outer housing assembly 10. As such, the inner housing assembly 60 will preferably include a first inner shell 70 and a second inner shell 90 attachable with respect to one another to define the inner housing duct 64 therebetween. The first inner shell 70 and the second inner shell 90 will be attachable with respect to one another by an inner housing attachment means 67 which can comprise conventional threaded fasteners or nut and bolt configurations or alignment pins or can be secured to one another by adhesives such as glue With this construction telescopic movement of the inner housing assembly 60 within the outer housing duct 14 of the outer housing assembly 10 allows adjustment of the depth of the final configuration of protective conduit 8 despite variations in the thickness of the wall, ceiling or floor panel assembly 2. As such, the positioning of the inner housing flange 66 and the inner housing flange gasket 61 of the inner housing assembly 60 can be made flush against the outwardly facing surface of the second panel 60 at the same time that the outer housing flange 16 and outer housing flange gasket 11 of the outer housing assembly 10 are positioned in flush engagement with respect to the outwardly facing surface of the first wallboard panel 4. Simultaneously engaging of each of these constructions relative to the wall assembly 12 is only possible because of the telescoping moveable engagement provided by the construction of the present invention between the outer housing assembly 10 and the inner housing assembly 60.

Preferably the construction of the outer housing assembly 10 and, in particular, the first outer shell 20 and second outer shell 40 thereof are formed of a thermoplastic material. Similarly, preferably, the inner housing assembly 60 is also formed of a first inner shell 70 and a second inner shell 90 which are both configured also of a thermoplastic material. This provides ease of construction and minimizes costs of manufacturing of the protective conduit of the present invention.

In a preferred configuration of the present invention the first outer shell 20 and the second outer shell 40 will both be identically figured. This will minimize inventory difficulties and will provide a rapid means for repair and replacement and will facilitate initial installation of the protective conduits of the present invention. In particular, the first outer shell 20 of the outer housing assembly 10 will define a first outer shell duct 26 extending therethrough. It will also define a first outer shell inlet means 22 on one end of said first outer shell duct 26 and a first outer shell outlet 24 on the opposite end thereof. The first outer shell inlet means 22, the first outer shell outlet means 24 and the first outer shell duct 26 will all be in fluid flow communication with respect to one another.

The second outer shell 40 will combine with the first outer shell 20 to define the second outer shell duct 46 extending therethrough between a second outer shell inlet means 42 at one end and a second outer shell outlet means 44 at the opposite end. In this manner second outer shell inlet means 42, second outer outlet means 44 and second outer shell duct 46 will all be in fluid flow communication with respect to one another. The first outer shell 20 will also include a first outer shell attachment means 32 and the second outer shell 40 will include a second outer shell attachment means 52. The attachment means 32 and 52 provide a means for attaching of the first outer shell 20 to the second outer shell 40. When this attachment is made utilizing the attachment means 32 in engagement with the attachment means 52 the first outer shell duct 26 will be positioned adjacent to the second outer shell duct 46 and in this manner define the outer housing duct 14. Similarly the first outer shell inlet means 22 will be positioned adjacent to the second outer shell inlet means 42 and in this manner together define the outer housing inlet means 12. Finally, the first outer shell outlet means 24 will be positioned adjacent to the second outer shell outlet means 44 and in this manner define the outer housing outlet means 13.

The first outer shell 20 will preferably include a first outer shell flange 30 and the second outer shell 40 will include a second outer shell flange 50 which, when positioned adjacent to one another, will form the outer housing flange 16.

The inner housing assembly 60 is preferably formed as a two part construction including a first inner shell 70 and a second inner shell 90. First inner shell 70 defines therein a first inner shell duct 76 extending therealong between a first inner shell outlet means 74 and a first inner shell inlet means 72. First inner shell 70 also includes a first inner shell attachment means 82 to facilitate securement thereof with respect to the second inner shell 90.

Second inner shell 90 preferably defines a second inner shell duct 96 extending between a second inner shell outlet means 94 and a second inner shell inlet means 92. Second inner shell 90 also defines a second inner shell attachment means 102 which is adapted to be engageable with respect to the first inner shell attachment means 82 of the first inner shell 70 for facilitating securement of the second inner shell 90 to the first inner shell 70 and allow positioning thereof around penetrating members which are already positioned extending through a wall to facilitate after market placement of the protective conduit 8 of the present invention.

When the first inner shell attachment means 82 and the second inner shell attachment means 102 are secured with respect to one another the second inner shell duct 96 will be positioned adjacent to the first inner shell duct 76 in such a manner that they will define the inner housing duct 64. Similarly, when the first inner shell inlet means 72 is secured in a position adjacent to the second inner shell inlet means 92 by securement between attachment means 82 and 102, they will cooperate together to define the inner housing inlet means 62. Also, the first inner shell outlet means 74 and the second inner shell outlet means 94 will be positioned adjacent to one another responsive to securement between attachment means 82 and attachment means 102, they will cooperate together to define the inner housing outlet means 63 of the inner housing assembly 60.

First inner shell 70 will preferably also include a first inner shell flange 80 and second inner shell 90 will preferably include a second inner shell flange 100. When flanges 80 and 100 are positioned adjacent to one another they will cooperate to form the final construction of the inner housing flange 66 of inner housing assembly 60.

In order to enhance the firestopping capabilities of the protective conduit 8 of the present invention and to minimize the movement of sound, heat and/or smoke therethrough, the present invention will preferably include a duct sealing means 110. Duct sealing means 110 is preferably formed of a thermally molded flexible rubber-type or elastomeric material which resists burning but will only char when exposed to extremely high temperatures. Elastomeric materials possess these characteristics and currently are the preferred material for this purpose. Although thermal set molded rubber material is not a rated firestopping material, it does tend to maintain its structural position since it normally only chars and does not excessively degrade structurally in response to exposure thereof to fire conditions. As such, positioning a duct sealing means 110 made of this elastomeric material extending across the inner housing duct 64 achieves some level of fire resistance and is somewhat effective in preventing the spread of smoke and heat from a fire, while also inhibiting of sound transmission thereby. As such, a duct sealing means 110 is designed to be positioned within the inner housing duct 64 of the inner housing assembly 60 for sealing around penetrating members 7 positioned extending through the axial corridor 9 defined therein.

The duct sealing means 110 is preferably constructed of two separate sections identified in this detailed embodiment as the first sealing member 130 and the second sealing member 150. First sealing member 130 is generally wedge-shaped and defines a first abutting panel 132 positioned between a first inlet inclined panel 134 and a first outlet inclined panel 136. First inlet inclined panel 134 extends away from the first abutting panel 132 outwardly at an oblique angle with respect thereto toward the inner housing inlet means 62 and engages the inner housing assembly 60 thereadjacent. Similarly the first outlet inclined panel 136 extends outwardly in the opposite direction at an oblique angle away from the first abutting panel 132 such that it is brought into abutment with respect to the inner housing assembly 60 adjacent to the inner housing outlet means 63. The first sealing member 130 is secured in place by a first sealing member attachment means 138 which can comprise any type of a securement means preferably adhesives such as glue or the like or threaded fasteners. Additionally the first sealing member 130 can extend at least partially between the edges of the first inner shell 70 and the second inner shell 90 and, in this manner, be affixed in position. The purpose of the first sealing member attachment means 138 is to secure the first sealing member 130 with respect to the inner housing assembly 60. This is best achieved by providing a first sealing member lip 140 extending outwardly and positionable between and pinched between the first inner shell 70 and the second inner shell 90 when attached together. In this manner the first sealing member lip 140 will be retained with respect to the other portions of the inner housing assembly 60 in order to prevent disengagement of first sealing member 130 therefrom.

The construction of the present invention further includes a second sealing member 150 which is generally wedge-shaped and includes a second abutting panel 152. The second sealing member 150 is positionable when secured in place to be adjacent to the first sealing member 130 with the second abutting panel 152 positioned in direct abutment with respect to the first abutting panel 132 for sealing across the axial corridor extending therethrough and around penetrating members 7 positioned extending therethrough. Second sealing member 150 includes a second inlet inclined panel 154 extending at an oblique angle away from the second abutting panel 152 toward the inner housing inlet means 62 in a direction extending away from the first inlet inclined panel 134. Similarly the second outlet inclined panel 156 is attached to the second abutment panel 152 and extends outwardly away therefrom at an oblique angle while oriented oppositely from the first outlet inclined panel 136 to a position in abutment with respect to the inner housing assembly 60 adjacent to the inner housing outlet means 63 at a position spatially disposed from the first outlet inclined panel 136. Securement between the second sealing member 150 and the inner housing assembly 60 is achieved by a second sealing member attachment means 158 which can comprise a glue material or an adhesive or by gripping of an outwardly extending lip. The securement by the second sealing member attachment means 158 is enhanced by the inclusion of a second sealing member lip 160 in the basic construction of the second sealing member 150 to facilitate operative engagement by the attachment means 158. Second sealing member lip 160 extends outwardly from the other portions of the second sealing member 150 to be positionable between and pinched between the first inner shell 70 and the second inner shell 90 when attached together.

In this manner, with first inner shell 70 attached to second inner shell 90, the first sealing member 130 and the second sealing member 150 will provide a wedge-shaped configuration with the second abutting panel 152 in direct abutment with respect to the first abutting panel 132 with penetrating members 7 extending therebetween and sealed therearound by members 130 and 150. The inclined panels 134 and 136 are angled outwardly away from the corresponding inclined panels 154 and 156. The penetrating members 7 can easily be placed between the first and second abutting panels 132 and 152 of the first sealing member 130 and the second sealing member 150 since they are spaced apart in a wedge-shaped configuration.

The duct sealing means 110 is defined to include an inlet inclined duct section 114 which includes the first inlet inclined panel 134 and the second inlet inclined panel 154. Similarly the duct sealing means includes an outlet inclined duct section 116 defined including the first outlet inclined panel 136 and the second outlet inclined 156. In this manner a wedge-shaped passageway will be provided in duct sections 114 and 116 as above described on each opposite side of the first and second abutting panels 132 and 152. Abutting panels 132 and 152 will be in direct abutting engagement with respect to one another and, as such, will define a sealing seam 112 therebetween which is positioned between duct sections 114 and 116.

It is important to appreciate that the first abutting panel 132 and the second abutting panel 152 are both made of an elastomeric material that is somewhat flexibly resilient. As such, when panels 132 and 152 are in direct abutment With respect to one another defining the sealing seal 112 therebetween, it is quite easy to push one or more penetrating members 7 therebetween. Additionally the flexible resilience of the panels 132 and 152 then serves to fit fairly tightly around the penetrating members and achieve effective sealing therearound which is resistant to transmission of sound, fire, heat or smoke therearound.

Since the construction of the duct sealing means 110 of the present invention is formed from two separate sealing members 130 and 150, they can be placed around one or more penetrating members 7 even in those applications where such penetrating members 7 are already positioned extending through a structural building panel such as a wall, floor or ceiling prior to installation of the conduit 8. The duct sealing means 110 of the present invention preferably includes a duct seal attachment means 118 for facilitating securement of both the first sealing member 130 and the second sealing member 150 with respect to the inner housing assembly 60. In this manner the duct sealing attachment means 118 will include both the first sealing member attachment means 138 and the second sealing member attachment means 158. Attachment by the duct seal attachment means 118 is achieved by operation of the first sealing member attachment means 138 along the first sealing member lip 140 and by operation of the second sealing member attachment means 158 along the second sealing member lip 160. In particular, the attachment achieved by the first sealing member attachment means 138 and by the second sealing member attachment means 158 can conveniently utilize an adhesive or glue. Additionally, the first sealing lip 140 and the second sealing lip 160 can be positioned between the edges of the first inner shell and the second inner shell such that when they are attached together, this action will also secure lips 140 and lip 160 therebetween and, thus, further facilitate securement of the duct sealing means in position extending over the axial corridor.

The outer housing assembly 10 will define an outer housing seam 19 between the first outer shell 20 and the second outer shell 40. Similarly, the inner housing assembly 60 will define an inner housing seam 69 between the first inner shell 70 and the second inner shell 90. It should be appreciated that the dual part construction of the outer housing assembly is strengthened by positioning the inner housing assembly 60 within the outer housing assembly 10 with the inner housing seam 69 thereof oriented perpendicularly with respect to the outer housing seam 19 such that these two seams do not overlap. This non-overlapping configuration significantly strengthens the final overall construction of the protective conduit 9. Thus, the two-part inner housing assembly 60 is rotationally clocked by 90 degrees relative to the two-part construction of the outer housing assembly 10 in order to enhance the integrity and structural strength of the construction.

The first outer shell 20 and the first inner shell 40 of the outer housing assembly 10 will each preferably define therein a first longitudinal channel 37 and a second longitudinal channel 57, respectively, extending axially therewithin and facing inwardly therefrom toward the position of an inner housing assembly 60 when telescopically engaged therewith responsive to extending within said outer housing duct. The first inner shell attachment means 82 and the second inner shell attachment means will be configured extending outwardly from the inner housing assembly 60. In the preferred configuration shown in the Figures herein, the first inner shell attached means 82 will be positionable extending into said first longitudinal channel 37 and said second inner shell attachment means 82 will be positionable extending into said second longitudinal channel 57. With this configuration, proper alignment between outer housing assembly 10 and inner housing assembly will be encouraged.

The preferred embodiment shown herein also utilizes channels 37 and 57 to control slidable telescoping movement of the inner housing assembly relative to the outer housing assembly 10. This control is facilitated by constructing the first sealing member lip 140 including a first outwardly protruding lip section 142 and by constructing the second sealing member lip 160 including a second outwardly protruding lip section 162. The sections 142 and 162 are constructed extending radially outwardly from the inner housing assembly 60 into the first and second longitudinally extending channels 37 and 57 and into engaging abutment with respect to said first outer shell 20 and said second outer shell 40 within the channels 37 and 57. The outwardly projecting lip sections 142 and 162 are, preferably, made of an elastomeric material which is flexibly resilient. Further, preferably, sections 142 and 162 are integrally formed with respect to said first sealing member 130 and said second sealing member 150, respectively. With this construction the outwardly extending lip sections 142 and 162 will be resiliently biased against the outer housing assembly 10 within the first and second longitudinally extending channels 37 and 57 defined therein which will create a frictional resistance to relative telescopic movement of the inner housing assembly 16 relative to the outer housing assembly 10. Also abutment of sections 142 and 162, because of abutment with respect to outer housing assembly 10, will facilitate the maintaining of proper alignment thereof with respect to the inner housing assembly 60 during relative telescopic movement therebetween.

One of the important characteristics of the present invention is the tapered configuration of the first and second sealing members 130 and 150. The wedge-shaped configuration greatly facilitates the placement of penetrating members in the axial corridor 9 extending therethrough. The two separate parts of the construction for the outer housing assembly 10, the inner housing assembly 60 and the duct sealing means 110 facilitates use with existing pass through applications where penetrating members 7 are already positioned extending through a panel opening defined in a panel assembly 2. Also the wedge-shaped configuration of the inner housing duct 64 defined by the first sealing member 130 and the second sealing member 150 also greatly enhances the ease of placement of penetrating members 7 extending therebetween. Such placement is further enhanced by the flexibly resilient material from which the first and second abutting panels 132 and 152 are formed which can easily open the sealing seam 112 and position penetrating members extending therethrough and then snugly fit therearound for sealing against penetrating members 7 extending therethrough.

One of the unique aspects of the present invention the use of identical parts for the two half sections of the outer housing assembly 10 as well as the inner housing assembly 60 and the duct sealing means 110. In particular, the outer housing assembly 10 includes a first outer shell 20 and a second outer shell 40 both of which are preferably made of a thermoplastic material. The key aspect of the shells 20 and 40 is that they are identical to one another. The use of identical made pieces which complement one another to such an extent that they can form the outer housing assembly 10 by mated engagement therebetween. This is a distinct advantage in product marketing. Inventory is much easier to manage when the first outer shell 20 and the second outer shell 40 are the same identical part.

Further, the inner housing assembly 60 is defined to include a first inner shell 70 and a second inner shell 90. These two parts are both thermoplastic and preferably are chosen of a configuration and are of identical configurations. That is, the parts used for the first inner shell 70 and the second inner shell 90 are virtually interchangeable with respect to one another. This greatly enhances inventory control for initial construction as well as ongoing maintenance The third major portion of the embodiment described above is the duct sealing means 110. The duct sealing means 110 includes a first sealing member 130 and a second sealing member 150, each of which is formed preferably of a thermally set molded flexible elastomeric or rubber material. Here again the configuration of the first sealing member 130 and the second sealing member 150 are virtually identical with respect to one another such that are interchangeable. This construction enhances inventory control as described above.

Preferably, the outer housing assembly 10 defines an outer housing outlet groove 164 adjacent to and extending around said outer housing outlet means 13. Similarly, the inner housing assembly 60, preferably, defines an inner housing outlet groove 168 adjacent to and extending around said inner housing outlet means 63. Grooves 164 and 168 provide a convenient manner for mounting of external seal devices on each opposite end of the protective conduit 9 of the present invention. An outer housing outlet sealing member 166 can easily and effectively be positioned within the outer housing outlet means 13 for facilitating sealing thereof against the transmission of fire, heat, smoke and sound along said axial corridor. In a similar manner, an inner housing outlet sealing member 170 can easily and effectively be positioned within the inner housing outlet means 63 for facilitating sealing thereof against the transmission of fire, heat, smoke and sound along said axial corridor. The outer housing outlet sealing member 166 and the inner housing outlet sealing member 170 are, preferably, of identical construction. Members 166 and 170 each including a first curtain seal panel 172 and a second curtain seal panel 174 overlapping one another and defining a curtain seal slot 176 therebetween to permit penetrating members 7 to pass between members 166 and 170 and through curtain seal slot 176 with fully effective sealing therearound.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

The invention claimed is:

1. A protective conduit for a structural panel which is positionable in a panel opening defined in a panel assembly with penetrating members extending therethrough, said protective conduit comprising:
   A. an outer housing assembly comprising:
      (1) a first outer shell including:
         a. a first outer shell attachment means;
         b. a first outer shell inlet means;
         c. a first outer shell duct in fluid flow communication with respect to said first outer shell inlet means;
         d. a first outer shell outlet means spatially disposed from said first outer shell inlet means and in fluid flow communication with respect to said first outer shell duct and said first outer shell inlet means;
      (2) a second outer shell including:
         a. a second outer shell attachment means securable with respect to said first outer shell attachment means to attach said second outer shell with respect to said first outer shell;
         b. a second outer shell inlet means positionable adjacent said first outer shell inlet means to define therewith an outer housing inlet means responsive to attachment between said first outer shell attachment means and said second outer shell attachment means;
         c. a second outer shell duct in fluid flow communication with respect to said first outer shell inlet means and being positionable adjacent said first outer shell duct to define therewith an outer housing duct responsive to attachment between said first outer shell attachment means and said second outer shell attachment means;
         d. a second outer shell outlet means spatially disposed from said first outer shell inlet means and in fluid flow communication with respect to said first outer shell duct and said first outer shell inlet means and being positionable adjacent said first outer shell outlet means to define therewith an outer housing outlet means responsive to attachment between said first outer shell attachment means and said second outer shell attachment means;
   B. an inner housing assembly including:
      (1) a first inner shell including:
         a. a first inner shell attachment means;
         b. a first inner shell inlet means;
         c. a first inner shell duct in fluid flow communication with respect to said first inner shell inlet means;
         d. a first inner shell outlet means spatially disposed from said first inner shell inlet means and in fluid flow communication with respect to said first inner shell duct and said first inner shell inlet means;
      (2) a second inner shell including:
         a. a second inner shell attachment means securable with respect to said first inner shell attachment means to attach said second inner shell with respect to said first inner shell;
         b. a second inner shell inlet means positionable adjacent said first inner shell inlet means to define therewith an inner housing inlet means responsive to attachment between said first inner shell attachment means and said second inner shell attachment means;
         c. a second inner shell duct in fluid flow communication with respect to said first inner shell inlet means and being positionable adjacent said first inner shell duct to define therewith an inner housing duct responsive to attachment between said first inner shell attachment means and said second inner shell attachment means, said inner housing duct defining an axial corridor extending therethrough to receive and retain penetrating members extending therethrough;
         d. a second inner shell outlet means spatially disposed from said first inner shell inlet means and in fluid flow communication with respect to said first inner shell duct and said first inner shell inlet means and being positionable adjacent said first inner shell outlet means to define therewith an inner housing outlet means responsive to attachment between said first inner shell attachment means and said second inner shell attachment means;
   C. duct sealing means for inhibiting movement of fire, heat, smoke and sound through said inner housing duct along said axial corridor, said duct sealing means comprising:
      (1) a first sealing member for sealing adjacent said first inner shell and positioned extending at least partially across said axial corridor, said first sealing member including:
         a. a first abutting panel;
         b. a first outwardly projecting lip section extending outwardly therefrom toward said outer housing assembly, said first outwardly projecting lip section being positionable in abutting engagement with respect to said outer shell assembly to provide frictional resistance to relative telescoping movement of said inner shell assembly with respect to said outer shell assembly;
      (2) a second sealing member for sealing adjacent said second inner shell and positioned extending at least partially across said axial corridor, said second sealing member including:
         a. a second abutting panel adapted to abut along said first abutting panel responsive to attachment of said first inner shell to said second inner shell to facilitate sealing across said axial corridor; and
         b. a second outwardly projecting lip section extending outwardly therefrom toward said outer housing assembly, said second outwardly projecting lip section being positionable in abutting engagement with respect to said outer shell assembly to provide frictional resistance to relative telescoping movement of said inner shell assembly with respect to said outer shell assembly.

2. A protective conduit for a structural panel which is positionable in a panel opening defined in a panel assembly with penetrating members extending therethrough as defined in claim 1 wherein said first outer shell and said first inner shell are identically constructed, and wherein said first inner shell and said second inner shell are identically constructed, and wherein said first sealing member and said second sealing member are identically constructed.

3. A protective conduit for a structural panel which is positionable in a panel opening defined in a panel assembly with penetrating members extending therethrough as defined in claim 1 wherein said first outer shell defines a first longitudinal channel therewithin oriented extending generally parallel to said axial corridor, and wherein said second outer shell defines a second longitudinal channel therewithin oriented extending generally parallel to said axial corridor.

4. A protective conduit for a structural panel which is positionable in a panel opening defined in a panel assembly with penetrating members extending therethrough as defined in claim 3 wherein said first outwardly projecting lip section and said second outwardly projecting lip section extend into abutment with said outer housing assembly within said first longitudinal channel thereof and also within said second longitudinal channel thereof to provide frictional resistance between said inner shell assembly and said outer shell assembly to facilitate control of relative telescoping movement therebetween.

5. A protective conduit for a structural panel which is positionable in a panel opening defined in a panel assembly with penetrating members extending therethrough as defined in claim 4 wherein said first inner shell attachment means and said second inner shell attachment means are positioned on said inner housing assembly extend radially outwardly therefrom and into said first longitudinal channel and said second longitudinal channel defined by said outer housing assembly.

6. A protective conduit for a structural panel which is positionable in a panel opening defined in a panel assembly with penetrating members extending therethrough as defined in claim 4 wherein said first outwardly projecting lip section and said second outwardly projecting lip section are made of a resilient elastomeric material.

7. A protective conduit for a structural panel which is positionable in a panel opening defined in a panel assembly with penetrating members extending therethrough as defined in claim 4 wherein said first sealing member, said second sealing member, said first outwardly projecting lip section and said second outwardly projecting lip section are made of a resilient elastomeric material.

8. A protective conduit for a structural panel which is positionable in a panel opening defined in a panel assembly with penetrating members extending therethrough as defined in claim 1 wherein said first sealing member and said second sealing member are made of a resilient elastomeric material.

9. A protective conduit for a structural panel which is positionable in a panel opening defined in a panel assembly with penetrating members extending therethrough as defined in claim 1 wherein said first sealing member and said first outwardly projecting lip section are integral formed with respect to one another from resilient elastomeric material and wherein said second sealing member and said second outwardly projecting lip section are integral formed with respect to one another from resilient elastomeric material.

10. A protective conduit for a structural panel which is positionable in a panel opening defined in a panel assembly with penetrating members extending therethrough as defined in claim 1 wherein said first sealing member and said second sealing member are formed of resilient elastomeric material and are positioned extending completely across said axial corridor with said first abutting panel and said second abutting panel in abutment with respect to one another along a sealing seam defined therebetween to facilitate sealing around penetrating members positioned extending along said axial corridor and through said seam between said first abutting panel and said second abutting panel.

11. A protective conduit for a structural panel which is positionable in a panel opening defined in a panel assembly with penetrating members extending therethrough as defined in claim 1 wherein said first outer shell includes a first outer shell flange and wherein said second outer shell includes a second outer shell flange, said first outer shell flange and said second outer shell flange positioned adjacently responsive to attachment of said first outer shell to said second outer shell to define an outer housing flange extending around said outer housing assembly to facilitate securement thereof with respect to a structural panel around a panel opening defined therein.

12. A protective conduit for a structural panel which is positionable in a panel opening defined in a panel assembly with penetrating members extending therethrough as defined in claim 11 wherein said first inner shell includes a first inner shell flange and wherein said second inner shell includes a second inner shell flange, said first inner shell flange and said second inner shell flange positioned adjacently responsive to attachment of said first inner shell to said second inner shell to define an inner housing flange extending around said inner housing assembly to facilitate securement thereof with respect to a structural panel around a panel opening defined therein at a location spatially disposed from said outer shell flange.

13. A protective conduit for a structural panel which is positionable in a panel opening defined in a panel assembly with penetrating members extending therethrough as defined in claim 12 further comprising an outer housing flange gasket positionable between said outer housing flange and a structural panel thereadjacent to facilitate sealing therebetween, and further comprising an inner housing flange gasket positionable between said inner housing flange and a structural panel thereadjacent to facilitate sealing therebetween.

14. A protective conduit for a structural panel which is positionable in a panel opening defined in a panel assembly with penetrating members extending therethrough as defined in claim 1 wherein said outer housing assembly defines an outer housing outlet groove adjacent said outer housing outlet means and wherein said inner housing assembly defines an inner housing outlet groove adjacent said inner housing outlet means.

15. A protective conduit for a structural panel which is positionable in a panel opening defined in a panel assembly with penetrating members extending therethrough as defined in claim 14 further comprising an outer housing outlet sealing member positionable within said outer housing outlet groove to extend across said outer housing outlet means to facilitate sealing thereof.

16. A protective conduit for a structural panel which is positionable in a panel opening defined in a panel assembly with penetrating members extending therethrough as defined in claim 14 further comprising an inner housing outlet sealing member positionable within said inner housing outlet groove to extend across said inner housing outlet means to facilitate sealing thereof.

17. A protective conduit for a structural panel which is positionable in a panel opening defined in a panel assembly with penetrating members extending therethrough as defined in claim 16 wherein said outer housing outlet sealing member and said inner housing outlet sealing member are of identical construction and each include:
    A. a first curtain seal panel; and
    B. a second curtain seal panel overlapping said first curtain seal panel and defining a curtain seal slot to facilitate penetrating members to extend therethrough and to facilitate sealing therearound.

18. A protective conduit for a structural panel which is positionable in a panel opening defined in a panel assembly with penetrating members extending therethrough as defined in claim 1 wherein said first sealing member of said duct sealing means is glued directly to said first inner shell and wherein said second sealing member is glued directly to said second inner shell.

19. A protective conduit for a structural panel which is positionable in a panel opening defined in a panel assembly with penetrating members extending therethrough, said protective conduit comprising:
A. an outer housing assembly comprising:
  (1) a first outer shell including:
    a. a first outer shell attachment means;
    b. a first outer shell inlet means;
    c. a first outer shell duct in fluid flow communication with respect to said first outer shell inlet means;
    d. a first outer shell outlet means spatially disposed from said first outer shell inlet means and in fluid flow communication with respect to said first outer shell duct and said first outer shell inlet means;
  (2) a second outer shell including:
    a. a second outer shell attachment means securable with respect to said first outer shell attachment means to attach said second outer shell with respect to said first outer shell;
    b. a second outer shell inlet means positionable adjacent said first outer shell inlet means to define therewith an outer housing inlet means responsive to attachment between said first outer shell attachment means and said second outer shell attachment means;
    c. a second outer shell duct in fluid flow communication with respect to said first outer shell inlet means and being positionable adjacent said first outer shell duct to define therewith an outer housing duct responsive to attachment between said first outer shell attachment means and said second outer shell attachment means;
    d. a second outer shell outlet means spatially disposed from said first outer shell inlet means and in fluid flow communication with respect to said first outer shell duct and said first outer shell inlet means and being positionable adjacent said first outer shell outlet means to define therewith an outer housing outlet means responsive to attachment between said first outer shell attachment means and said second outer shell attachment means;
B. an inner housing assembly including:
  (1) a first inner shell including:
    a. a first inner shell attachment means;
    b. a first inner shell inlet means;
    c. a first inner shell duct in fluid flow communication with respect to said first inner shell inlet means;
    d. a first inner shell outlet means spatially disposed from said first inner shell inlet means and in fluid flow communication with respect to said first inner shell duct and said first inner shell inlet means;
  (2) a second inner shell including:
    a. a second inner shell attachment means securable with respect to said first inner shell attachment means to attach said second inner shell with respect to said first inner shell;
    b. a second inner shell inlet means positionable adjacent said first inner shell inlet means to define therewith an inner housing inlet means responsive to attachment between said first inner shell attachment means and said second inner shell attachment means;
    c. a second inner shell duct in fluid flow communication with respect to said first inner shell inlet means and being positionable adjacent said first inner shell duct to define therewith an inner housing duct responsive to attachment between said first inner shell attachment means and said second inner shell attachment means, said inner housing duct defining an axial corridor extending therethrough to receive and retain penetrating members extending therethrough;
    d. a second inner shell outlet means spatially disposed from said first inner shell inlet means and in fluid flow communication with respect to said first inner shell duct and said first inner shell inlet means and being positionable adjacent said first inner shell outlet means to define therewith an inner housing outlet means responsive to attachment between said first inner shell attachment means and said second inner shell attachment means;
C. duct sealing means for inhibiting movement of fire, heat, smoke and sound through said inner housing duct along said axial corridor, said duct sealing means comprising:
  (1) a first sealing member of resilient material which is secured to said first inner shell and extends outwardly away therefrom across said axial corridor for facilitating sealing thereof, said first sealing member including a first abutting panel of resilient material;
  (2) a second sealing member of resilient material which is secured to said second inner shell and extends outwardly away therefrom toward said first sealing means and across said axial corridor for facilitating sealing thereof, said first sealing member including a second abutting panel of resilient material positionable in abutment with respect to said second abutting panel and defining a sealing seam extending therebetween to facilitate sealing of penetrating members positioned extending along said axial corridor.

20. A protective conduit for a structural panel which is positionable in a panel opening defined in a panel assembly with penetrating members extending therethrough wherein the panel assembly includes a first panel and a second panel spaced spatially disposed from each other, said protective conduit comprising:
A. an outer housing assembly comprising:
  (1) a first outer shell including:
    a. a first outer shell attachment means;
    b. a first outer shell inlet means;
    c. a first outer shell duct in fluid flow communication with respect to said first outer shell inlet means;
    d. a first outer shell outlet means spatially disposed from said first outer shell inlet means and in fluid flow communication with respect to said first outer shell duct and said first outer shell inlet means;
  (2) a second outer shell including:
    a. a second outer shell attachment means securable with respect to said first outer shell attachment means to attach said second outer shell with respect to said first outer shell;
    b. a second outer shell inlet means positionable adjacent said first outer shell inlet means to define therewith an outer housing inlet means responsive to attachment between said first outer shell attachment means and said second outer shell attachment means;
c. a second outer shell duct in fluid flow communication with respect to said first outer shell inlet means and being positionable adjacent said first outer shell duct to define therewith an outer housing duct responsive to attachment between said first outer shell attachment means and said second outer shell attachment means;
d. a second outer shell outlet means spatially disposed from said first outer shell inlet means and in fluid flow communication with respect to said first outer shell duct and said first outer shell inlet means and being positionable adjacent said first outer shell outlet means to define therewith an outer housing outlet means responsive to attachment between said first outer shell attachment means and said second outer shell attachment means;

B. an inner housing assembly including:
(1) a first inner shell including:
 a. a first inner shell attachment means;
 b. a first inner shell inlet means;
 c. a first inner shell duct in fluid flow communication with respect to said first inner shell inlet means;
 d. a first inner shell outlet means spatially disposed from said first inner shell inlet means and in fluid flow communication with respect to said first inner shell duct and said first inner shell inlet means;
(2) a second inner shell including:
 a. a second inner shell attachment means securable with respect to said first inner shell attachment means to attach said second inner shell with respect to said first inner shell;
 b. a second inner shell inlet means positionable adjacent said first inner shell inlet means to define therewith an inner housing inlet means responsive to attachment between said first inner shell attachment means and said second inner shell attachment means;
 c. a second inner shell duct in fluid flow communication with respect to said first inner shell inlet means and being positionable adjacent said first inner shell duct to define therewith an inner housing duct responsive to attachment between said first inner shell attachment means and said second inner shell attachment means, said inner housing duct defining an axial corridor extending therethrough to receive and retain penetrating members extending therethrough;
 d. a second inner shell outlet means spatially disposed from said first inner shell inlet means and in fluid flow communication with respect to said first inner shell duct and said first inner shell inlet means and being positionable adjacent said first inner shell outlet means to define therewith an inner housing outlet means responsive to attachment between said first inner shell attachment means and said second inner shell attachment means;

C. duct sealing means for inhibiting movement of fire, heat, smoke and sound through said inner housing duct along said axial corridor, said duct sealing means comprising:
(1) a first sealing member for sealing adjacent said first inner shell which includes:
 a. a first sealing member attachment means for attaching said first sealing member with respect to said first inner shell thereadjacent;
 b. a first abutting panel extending across said axial corridor;
 c. a first inlet inclined panel attached to said first abutting panel and extending outwardly therefrom obliquely toward said first inner shell inlet means;
 d. a first outlet inclined panel attached to said first abutting panel and extending outwardly therefrom obliquely toward said first outer shell inlet means;
 e. a first sealing member lip extending peripherally around said first abutting panel, said first inlet inclined panel and said first outlet inclined panel;
 f. a first outwardly projecting lip section extending outwardly from said first sealing member, said first outwardly projecting lip section being positioned in abutting engagement with respect to said outer shell assembly to provide frictional resistance to relative telescoping movement of said inner shell assembly with respect to said outer shell assembly;
(2) a second sealing member for sealing adjacent said second inner shell which includes:
 a. a second sealing member attachment means for attaching said second sealing member with respect to said inner shell thereadjacent;
 b. a second abutting panel extending across said axial corridor and being adapted to abut along said first abutting panel responsive to attachment of said first inner shell to said second inner shell;
 c. a second inlet inclined panel attached to said second abutting panel and extending outwardly therefrom obliquely toward said second inner shell inlet means, said second inlet inclined panel being spatially disposed from said first inlet inclined panel;
 d. a second outlet inclined panel attached to said second abutting panel and extending outwardly therefrom obliquely toward said second outer shell inlet means, said second outlet inclined panel being spatially disposed from said first outlet inclined panel;
 e. a second sealing member lip extending peripherally around said second abutting panel, said second inlet inclined panel and said second outlet inclined panel;
 f. a second outwardly projecting lip section extending outwardly from said second sealing member, said second outwardly projecting lip section being positioned in abutting engagement with respect to said outer shell assembly to provide frictional resistance to relative telescoping movement of said inner shell assembly with respect to said outer shell assembly.

* * * * *